US009712999B1

(12) United States Patent
Cordes et al.

(10) Patent No.: US 9,712,999 B1
(45) Date of Patent: *Jul. 18, 2017

(54) DIGEST OF BIOGRAPHICAL INFORMATION FOR AN ELECTRONIC DEVICE WITH STATIC AND DYNAMIC PORTIONS

(71) Applicant: Sprint Communications Company L.P., Overland Park, KS (US)

(72) Inventors: Kevin R. Cordes, Lee's Summit, MO (US); Clinton H. Loman, Raymore, MO (US); Brian D. Mantel, Shawnee, KS (US); Lyle W. Paczkowski, Mission Hills, KS (US); Kenneth R. Steele, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/069,921

(22) Filed: Mar. 14, 2016

Related U.S. Application Data

(62) Division of application No. 13/857,141, filed on Apr. 4, 2013, now Pat. No. 9,324,016.

(51) Int. Cl.
*G08B 1/08* (2006.01)
*H04W 8/24* (2009.01)
(Continued)

(52) U.S. Cl.
CPC .......... *H04W 8/24* (2013.01); *G06K 7/10297* (2013.01); *G06Q 30/016* (2013.01); *H04B 5/0062* (2013.01)

(58) Field of Classification Search
None
See application file for complete search history.

(56) References Cited

U.S. PATENT DOCUMENTS

| 5,303,378 A | 4/1994 | Cohen |
| 5,321,735 A | 6/1994 | Breeden et al. |

(Continued)

FOREIGN PATENT DOCUMENTS

| EP | 1933252 A1 | 6/2008 |
| WO | WO2011025433 A1 | 3/2011 |

(Continued)

OTHER PUBLICATIONS

Notice of Allowance dated Jul. 6, 2015, U.S. Appl. No. 13/844,145, filed Mar. 15, 2013.

(Continued)

*Primary Examiner* — Curtis King

(57) ABSTRACT

A method of managing a lifecycle of a mobile communication device. The method comprises storing a biographical digest in a radio frequency identity chip of the mobile communication device at the time of manufacture of the communication device, wherein the biographical digest comprises information about the device and comprises a static portion and a dynamic portion. The method further comprises activating the device for wireless communication service; after activating the device, deactivating the device for wireless communication service; and after deactivating the device, writing a device status of the dynamic portion of the biographical digest in the radio frequency identity chip of the device to a value of dead, whereby the device is prevented from being activated for wireless communication service after once having the device status of the dynamic portion of the biographical digest in the radio frequency identity chip of the device written to the dead value.

20 Claims, 10 Drawing Sheets

(51) Int. Cl.
*H04B 5/00* (2006.01)
*G06Q 30/00* (2012.01)
*G06K 7/10* (2006.01)

(56) References Cited

U.S. PATENT DOCUMENTS

| | | | |
|---|---|---|---|
| 5,764,889 A | 6/1998 | Ault et al. |
| 5,796,952 A | 8/1998 | Davis et al. |
| 6,131,024 A | 10/2000 | Boltz |
| 6,177,860 B1 | 1/2001 | Cromer et al. |
| 6,219,712 B1 | 4/2001 | Mann et al. |
| 6,222,463 B1* | 4/2001 | Rai | G07C 5/008 340/905 |
| 6,363,150 B1 | 3/2002 | Bhagavath et al. |
| 6,389,403 B1 | 5/2002 | Dorak, Jr. |
| 6,477,180 B1 | 11/2002 | Aggarwal et al. |
| 6,507,869 B1 | 1/2003 | Franke et al. |
| 6,507,904 B1 | 1/2003 | Ellison et al. |
| 6,614,893 B1 | 9/2003 | Paiz |
| 6,651,171 B1 | 11/2003 | England et al. |
| 6,668,322 B1 | 12/2003 | Wood et al. |
| 6,691,230 B1 | 2/2004 | Bardon |
| 6,726,099 B2 | 4/2004 | Becker et al. |
| 6,754,784 B1 | 6/2004 | North et al. |
| 6,823,454 B1 | 11/2004 | Hind et al. |
| 6,824,064 B2 | 11/2004 | Guthery et al. |
| 6,842,106 B2 | 1/2005 | Hughes et al. |
| 6,895,234 B1 | 5/2005 | Laursen et al. |
| 7,043,241 B1 | 5/2006 | Sladek et al. |
| 7,069,234 B1 | 6/2006 | Cornelius et al. |
| 7,245,213 B1 | 7/2007 | Esterberg et al. |
| 7,339,476 B2 | 3/2008 | Macurek et al. |
| 7,366,806 B2 | 4/2008 | Milenkovic et al. |
| 7,386,275 B2* | 6/2008 | Pirzada | H04L 63/0492 340/426.1 |
| 7,387,240 B2 | 6/2008 | Ziegler |
| 7,450,010 B1 | 11/2008 | Gravelle et al. |
| 7,519,824 B1 | 4/2009 | Peyravian et al. |
| 7,552,467 B2 | 6/2009 | Lindsay |
| 7,571,364 B2 | 8/2009 | Whetsel |
| 7,574,382 B2 | 8/2009 | Hubert |
| 7,650,645 B1 | 1/2010 | Langendorf et al. |
| 7,716,720 B1 | 5/2010 | Marek et al. |
| 7,761,558 B1 | 7/2010 | Jindal et al. |
| 7,834,743 B2 | 11/2010 | Nagata et al. |
| 7,873,837 B1 | 1/2011 | Lee et al. |
| 7,895,642 B1 | 2/2011 | Larson et al. |
| 7,921,303 B2 | 4/2011 | Mauro, II |
| 7,924,156 B2 | 4/2011 | Colby |
| 8,060,449 B1 | 11/2011 | Zhu |
| 8,073,428 B2 | 12/2011 | Khetawat et al. |
| 8,086,238 B1 | 12/2011 | Kosar |
| 8,112,794 B2 | 2/2012 | Little et al. |
| 8,138,922 B2 | 3/2012 | Lindsay et al. |
| 8,174,384 B2 | 5/2012 | Stagg |
| 8,190,919 B2 | 5/2012 | Natarajan et al. |
| 8,204,480 B1 | 6/2012 | Lindteigen et al. |
| 8,217,793 B2 | 7/2012 | Broer |
| 8,238,823 B2 | 8/2012 | Maugars et al. |
| 8,244,179 B2 | 8/2012 | Dua |
| 8,271,336 B2 | 9/2012 | Mikurak |
| 8,295,811 B1* | 10/2012 | Gailloux | H04M 3/42144 455/411 |
| 8,311,509 B2 | 11/2012 | Feher |
| 8,316,237 B1 | 11/2012 | Felsher et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,443,420 B2 | 5/2013 | Brown et al. |
| 8,447,983 B1 | 5/2013 | Beck et al. |
| 8,466,791 B2 | 6/2013 | Goto et al. |
| 8,471,708 B1 | 6/2013 | Diorio et al. |
| 8,487,769 B2 | 7/2013 | Lindsay et al. |
| 8,494,576 B1 | 7/2013 | Bye et al. |
| 8,498,572 B1* | 7/2013 | Schooley | H04B 5/0031 340/10.51 |
| 8,504,097 B1 | 8/2013 | Cope et al. |
| 8,566,183 B1* | 10/2013 | Bonar | G06Q 10/08 705/28 |
| 8,588,749 B1 | 11/2013 | Sadhvani et al. |
| 8,631,247 B2 | 1/2014 | O'Loughlin et al. |
| 8,632,000 B2 | 1/2014 | Laracey |
| 8,649,770 B1 | 2/2014 | Cope et al. |
| 8,650,492 B1 | 2/2014 | Mui et al. |
| 8,661,119 B1 | 2/2014 | Jindal et al. |
| 8,667,607 B2 | 3/2014 | Paczkowski et al. |
| 8,681,969 B1 | 3/2014 | Rodde et al. |
| 8,707,056 B2 | 4/2014 | Felton |
| 8,712,407 B1 | 4/2014 | Cope et al. |
| 8,718,554 B2 | 5/2014 | Abel |
| 8,719,586 B1 | 5/2014 | Paleja et al. |
| 8,723,649 B2 | 5/2014 | Lavedas |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,127 B2 | 6/2014 | Musfeldt et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,797,144 B2 | 8/2014 | Hinman et al. |
| 8,797,875 B2 | 8/2014 | Garcia Martin et al. |
| 8,811,971 B2 | 8/2014 | Corda et al. |
| 8,816,826 B2 | 8/2014 | Colby |
| 8,831,998 B1 | 9/2014 | Cramer et al. |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,866,594 B1 | 10/2014 | Diorio et al. |
| 8,881,977 B1 | 11/2014 | Paczkowski et al. |
| 8,886,925 B2 | 11/2014 | Qureshi et al. |
| 8,954,588 B1 | 2/2015 | Bertz et al. |
| 8,984,592 B1 | 3/2015 | Paczkowski et al. |
| 8,989,705 B1 | 3/2015 | Katzer et al. |
| 9,015,068 B1 | 4/2015 | Bertz et al. |
| 9,021,585 B1 | 4/2015 | Paczkowski et al. |
| 9,027,102 B2 | 5/2015 | Katzer et al. |
| 9,049,013 B2 | 6/2015 | Paczkowski et al. |
| 9,049,186 B1 | 6/2015 | Paczkowski et al. |
| 9,066,230 B1 | 6/2015 | Paczkowski et al. |
| 9,069,952 B1 | 6/2015 | Paczkowski et al. |
| 9,087,318 B1 | 7/2015 | Cordes et al. |
| 9,104,840 B1 | 8/2015 | Paczkowski et al. |
| 9,111,280 B2 | 8/2015 | Sloan et al. |
| 9,118,655 B1 | 8/2015 | Paczkowski et al. |
| 9,161,227 B1 | 10/2015 | Bye et al. |
| 9,161,325 B1 | 10/2015 | Urbanek |
| 9,171,243 B1 | 10/2015 | Cordes et al. |
| 9,183,412 B2 | 11/2015 | Bye et al. |
| 9,183,606 B1 | 11/2015 | Paczkowski et al. |
| 9,185,626 B1 | 11/2015 | Kunkel et al. |
| 9,191,388 B1 | 11/2015 | Paczkowski et al. |
| 9,191,522 B1 | 11/2015 | Krieger et al. |
| 9,208,339 B1 | 12/2015 | Paczkowski et al. |
| 9,210,576 B1 | 12/2015 | Cope et al. |
| 9,215,180 B1 | 12/2015 | Bertz et al. |
| 9,226,145 B1 | 12/2015 | Loman et al. |
| 9,230,085 B1 | 1/2016 | Paczkowski et al. |
| 9,253,589 B2* | 2/2016 | McCann |
| 9,268,959 B2 | 2/2016 | Paczkowski et al. |
| 9,282,898 B2 | 3/2016 | McRoberts et al. |
| 9,286,594 B1 | 3/2016 | Cordes et al. |
| 9,324,016 B1 | 4/2016 | Cordes et al. |
| 9,331,996 B2 | 5/2016 | Musfeldt et al. |
| 9,374,363 B1 | 6/2016 | Paczkowski et al. |
| 9,384,498 B1 | 7/2016 | Bertz et al. |
| 9,396,424 B1 | 7/2016 | Loman et al. |
| 9,398,428 B2 | 7/2016 | Steinbach et al. |
| 9,426,604 B1 | 8/2016 | Cordes et al. |
| 9,432,364 B2 | 8/2016 | Lee et al. |
| 9,443,088 B1 | 9/2016 | Bye et al. |

(56) References Cited

U.S. PATENT DOCUMENTS

| | | |
|---|---|---|
| 9,454,723 B1 | 9/2016 | Cordes et al. |
| 9,460,573 B1 | 10/2016 | Cordes et al. |
| 9,473,945 B1 | 10/2016 | Marquardt et al. |
| 9,560,519 B1 | 1/2017 | McCracken, Jr. et al. |
| 9,591,434 B1 | 3/2017 | Cordes et al. |
| 9,613,208 B1 | 4/2017 | Paczkowski et al. |
| 2001/0041591 A1 | 11/2001 | Carroll |
| 2002/0002468 A1 | 1/2002 | Spagna et al. |
| 2002/0007456 A1 | 1/2002 | Peinado et al. |
| 2002/0035697 A1 | 3/2002 | McCurdy et al. |
| 2002/0091569 A1 | 7/2002 | Kitaura et al. |
| 2002/0095389 A1 | 7/2002 | Gaines |
| 2002/0156911 A1 | 10/2002 | Croman et al. |
| 2002/0166070 A1 | 11/2002 | Mualem et al. |
| 2002/0174344 A1 | 11/2002 | Ting |
| 2002/0181503 A1 | 12/2002 | Montgomery |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0045273 A1 | 3/2003 | Pyhalammi et al. |
| 2003/0092435 A1* | 5/2003 | Boivin ................ H04M 17/00 455/419 |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0182347 A1 | 9/2003 | Dehlinger |
| 2003/0216143 A1 | 11/2003 | Roese et al. |
| 2003/0229514 A2 | 12/2003 | Brown |
| 2003/0237002 A1 | 12/2003 | Oishi et al. |
| 2004/0036572 A1* | 2/2004 | Forster ............... B60C 23/0433 340/5.61 |
| 2004/0043788 A1* | 3/2004 | Mittal .................... H04W 8/20 455/558 |
| 2004/0064351 A1 | 4/2004 | Mikurak |
| 2004/0093274 A1* | 5/2004 | Vanska .................. G01C 21/20 705/26.7 |
| 2004/0137890 A1* | 7/2004 | Kalke .................. G06Q 30/012 455/418 |
| 2004/0158840 A1 | 8/2004 | Rothman et al. |
| 2004/0202319 A1 | 10/2004 | Hussain et al. |
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Rindborg et al. |
| 2004/0264372 A1 | 12/2004 | Huang |
| 2005/0015601 A1 | 1/2005 | Tabi |
| 2005/0044375 A1 | 2/2005 | Paatero et al. |
| 2005/0045719 A1 | 3/2005 | Yang |
| 2005/0052994 A1 | 3/2005 | Lee |
| 2005/0091505 A1 | 4/2005 | Riley et al. |
| 2005/0107068 A1* | 5/2005 | Smith .................... H04W 12/12 455/409 |
| 2005/0123596 A1 | 6/2005 | Kohane et al. |
| 2005/0125396 A1 | 6/2005 | Liu |
| 2005/0138433 A1 | 6/2005 | Linetsky |
| 2005/0145688 A1* | 7/2005 | Milenkovic ........ G08B 21/0261 235/375 |
| 2005/0153741 A1* | 7/2005 | Chen .................... H04W 8/205 455/558 |
| 2005/0164680 A1* | 7/2005 | Gould ................... H04L 67/12 455/412.1 |
| 2005/0181796 A1 | 8/2005 | Kumar et al. |
| 2005/0200478 A1* | 9/2005 | Koch .................... G06Q 10/08 340/539.13 |
| 2005/0228892 A1 | 10/2005 | Riley et al. |
| 2005/0235166 A1 | 10/2005 | England et al. |
| 2005/0239481 A1 | 10/2005 | Seligmann |
| 2005/0258250 A1* | 11/2005 | Melick .................. G06K 17/00 235/462.46 |
| 2005/0272445 A1 | 12/2005 | Zellner |
| 2005/0280557 A1* | 12/2005 | Jha ....................... H04W 8/22 340/988 |
| 2005/0283660 A1 | 12/2005 | McKeen et al. |
| 2005/0289355 A1 | 12/2005 | Kitariev et al. |
| 2006/0008256 A1 | 1/2006 | Khedouri et al. |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0053283 A1 | 3/2006 | Feinleib et al. |
| 2006/0074544 A1 | 4/2006 | Morariu et al. |
| 2006/0129488 A1 | 6/2006 | Vincent |
| 2006/0156026 A1 | 7/2006 | Utin |
| 2006/0161626 A1* | 7/2006 | Cardina ................ H04W 4/12 709/206 |
| 2006/0164978 A1 | 7/2006 | Werner et al. |
| 2006/0168637 A1 | 7/2006 | Vysotsky et al. |
| 2006/0171537 A1 | 8/2006 | Enright |
| 2006/0190605 A1 | 8/2006 | Franz et al. |
| 2006/0212853 A1 | 9/2006 | Sutardja |
| 2006/0218320 A1 | 9/2006 | Avraham et al. |
| 2006/0224901 A1 | 10/2006 | Lowe |
| 2006/0245438 A1 | 11/2006 | Sajassi et al. |
| 2006/0258289 A1 | 11/2006 | Dua |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0006175 A1 | 1/2007 | Durham et al. |
| 2007/0011061 A1 | 1/2007 | East |
| 2007/0035381 A1 | 2/2007 | Davis |
| 2007/0038648 A1 | 2/2007 | Chetwood et al. |
| 2007/0061535 A1 | 3/2007 | Xu et al. |
| 2007/0061570 A1 | 3/2007 | Holtzman et al. |
| 2007/0069852 A1 | 3/2007 | Mo et al. |
| 2007/0075140 A1 | 4/2007 | Guez et al. |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdzinski |
| 2007/0104215 A1 | 5/2007 | Wang et al. |
| 2007/0118880 A1 | 5/2007 | Mauro |
| 2007/0143210 A1 | 6/2007 | Yeung et al. |
| 2007/0150730 A1 | 6/2007 | Conti |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0188306 A1* | 8/2007 | Tethrake .................. G06K 5/00 340/10.51 |
| 2007/0197261 A1 | 8/2007 | Humbel |
| 2007/0214332 A1 | 9/2007 | Sonoda et al. |
| 2007/0226389 A1 | 9/2007 | Poortman |
| 2007/0276969 A1 | 11/2007 | Bressy et al. |
| 2007/0277223 A1 | 11/2007 | Datta et al. |
| 2007/0280245 A1 | 12/2007 | Rosberg |
| 2007/0283449 A1 | 12/2007 | Blum et al. |
| 2008/0005794 A1 | 1/2008 | Inoue et al. |
| 2008/0011825 A1* | 1/2008 | Giordano .............. G06Q 20/04 235/380 |
| 2008/0014867 A1 | 1/2008 | Finn |
| 2008/0020745 A1 | 1/2008 | Bae et al. |
| 2008/0022374 A1 | 1/2008 | Brown et al. |
| 2008/0022389 A1 | 1/2008 | Calcev et al. |
| 2008/0034231 A1 | 2/2008 | Ginter et al. |
| 2008/0051142 A1* | 2/2008 | Calvet .................. H04W 88/02 455/558 |
| 2008/0068166 A1* | 3/2008 | Lauper .................. H04M 3/387 340/572.1 |
| 2008/0089517 A1 | 4/2008 | Bianco et al. |
| 2008/0092213 A1 | 4/2008 | Wei et al. |
| 2008/0097793 A1 | 4/2008 | Dicks et al. |
| 2008/0100419 A1* | 5/2008 | Jatschka ............ G06K 19/0723 340/10.1 |
| 2008/0108321 A1 | 5/2008 | Taaghol et al. |
| 2008/0109662 A1 | 5/2008 | Natarajan et al. |
| 2008/0121687 A1 | 5/2008 | Buhot |
| 2008/0146280 A1 | 6/2008 | Sasse et al. |
| 2008/0155271 A1 | 6/2008 | Barck et al. |
| 2008/0159129 A1 | 7/2008 | Songhurst et al. |
| 2008/0159131 A1 | 7/2008 | Hoeflin et al. |
| 2008/0162361 A1 | 7/2008 | Sklovsky et al. |

(56) References Cited

U.S. PATENT DOCUMENTS

| | | |
|---|---|---|
| 2008/0168515 A1 | 7/2008 | Benson et al. |
| 2008/0176538 A1 | 7/2008 | Terrill et al. |
| 2008/0188178 A1 | 8/2008 | Maugars et al. |
| 2008/0198098 A1 | 8/2008 | Gelbman et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0232259 A1 | 9/2008 | Thomson |
| 2008/0238684 A1 | 10/2008 | Tuttle |
| 2008/0244758 A1 | 10/2008 | Sahita et al. |
| 2008/0271163 A1 | 10/2008 | Stillerman et al. |
| 2008/0303637 A1 | 12/2008 | Gelbman et al. |
| 2008/0304640 A1* | 12/2008 | Reilly .................. H04B 1/385 379/111 |
| 2009/0041241 A1 | 2/2009 | Dobyns et al. |
| 2009/0047923 A1 | 2/2009 | Jain et al. |
| 2009/0049220 A1 | 2/2009 | Conti et al. |
| 2009/0051539 A1 | 2/2009 | Ho |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0118839 A1 | 5/2009 | Accapadi et al. |
| 2009/0132381 A1* | 5/2009 | Gangi .................. G06K 7/0004 705/18 |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0160638 A1 | 6/2009 | Jesme |
| 2009/0164800 A1 | 6/2009 | Johansson et al. |
| 2009/0182605 A1 | 7/2009 | Lappas et al. |
| 2009/0182634 A1 | 7/2009 | Park et al. |
| 2009/0192915 A1 | 7/2009 | Fernandez |
| 2009/0193491 A1 | 7/2009 | Rao |
| 2009/0204959 A1 | 8/2009 | Anand et al. |
| 2009/0215385 A1* | 8/2009 | Waters ................ H04L 63/0853 455/1 |
| 2009/0224919 A1* | 9/2009 | Angell ............. B01F 15/00207 340/572.1 |
| 2009/0227290 A1* | 9/2009 | Chien ................ G06F 21/6254 455/558 |
| 2009/0248445 A1 | 10/2009 | Harnick |
| 2009/0271321 A1 | 10/2009 | Stafford |
| 2009/0281947 A1 | 11/2009 | Erel |
| 2009/0289764 A1* | 11/2009 | Chiu ...................... H04Q 9/00 340/10.1 |
| 2009/0300599 A1 | 12/2009 | Piotrowski |
| 2009/0312011 A1 | 12/2009 | Huomo et al. |
| 2009/0320028 A1 | 12/2009 | Gellerich et al. |
| 2009/0320048 A1 | 12/2009 | Watt et al. |
| 2010/0031325 A1 | 2/2010 | Maigne et al. |
| 2010/0052844 A1 | 3/2010 | Wesby |
| 2010/0066486 A1* | 3/2010 | Park ...................... G06F 21/305 340/5.3 |
| 2010/0075669 A1* | 3/2010 | Sparks .................. H04W 8/183 455/433 |
| 2010/0077487 A1 | 3/2010 | Travis et al. |
| 2010/0082977 A1 | 4/2010 | Boyle et al. |
| 2010/0121156 A1* | 5/2010 | Yoo ...................... G06F 19/3418 600/300 |
| 2010/0125512 A1 | 5/2010 | Jones et al. |
| 2010/0125904 A1 | 5/2010 | Nice et al. |
| 2010/0127868 A1* | 5/2010 | Hamilton, II .......... G06Q 10/08 340/572.1 |
| 2010/0128598 A1 | 5/2010 | Gandhewar et al. |
| 2010/0130170 A1 | 5/2010 | Liu et al. |
| 2010/0134252 A1 | 6/2010 | Sandler et al. |
| 2010/0142517 A1 | 6/2010 | Montemurro et al. |
| 2010/0146589 A1 | 6/2010 | Safa |
| 2010/0153721 A1 | 6/2010 | Mellqvist |
| 2010/0162028 A1 | 6/2010 | Frank et al. |
| 2010/0190469 A1 | 7/2010 | Vanderveen et al. |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0263029 A1 | 10/2010 | Tohmo et al. |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0030030 A1 | 2/2011 | Terpening et al. |
| 2011/0035604 A1 | 2/2011 | Habraken |
| 2011/0050713 A1 | 3/2011 | McCrary et al. |
| 2011/0055084 A1 | 3/2011 | Singh |
| 2011/0063093 A1 | 3/2011 | Fung et al. |
| 2011/0072492 A1 | 3/2011 | Mohler et al. |
| 2011/0078081 A1 | 3/2011 | Pirzadeh et al. |
| 2011/0078760 A1 | 3/2011 | De Perthuis |
| 2011/0082711 A1 | 4/2011 | Poeze et al. |
| 2011/0107426 A1 | 5/2011 | Yen et al. |
| 2011/0112968 A1 | 5/2011 | Florek et al. |
| 2011/0113479 A1 | 5/2011 | Ganem |
| 2011/0130635 A1 | 6/2011 | Ross |
| 2011/0138064 A1 | 6/2011 | Rieger et al. |
| 2011/0145923 A1 | 6/2011 | Largman et al. |
| 2011/0145926 A1 | 6/2011 | Dalcher et al. |
| 2011/0151836 A1 | 6/2011 | Dadu et al. |
| 2011/0154032 A1 | 6/2011 | Mauro |
| 2011/0166883 A1 | 7/2011 | Palmer et al. |
| 2011/0173090 A1 | 7/2011 | Miller et al. |
| 2011/0202916 A1 | 8/2011 | VoBa et al. |
| 2011/0208797 A1 | 8/2011 | Kim |
| 2011/0212707 A1 | 9/2011 | Mahalal |
| 2011/0216701 A1 | 9/2011 | Patel et al. |
| 2011/0218849 A1* | 9/2011 | Rutigliano ............ G06Q 20/20 705/14.25 |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0254687 A1* | 10/2011 | Arponen ........... H04M 1/72525 340/540 |
| 2011/0258443 A1* | 10/2011 | Barry .................... G06F 21/31 713/168 |
| 2011/0258462 A1 | 10/2011 | Robertson et al. |
| 2011/0269456 A1 | 11/2011 | Krishnaswamy et al. |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0040662 A1 | 2/2012 | Rahman et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0077468 A1 | 3/2012 | Fan et al. |
| 2012/0079100 A1* | 3/2012 | McIntyre ............ G06F 11/0742 709/224 |
| 2012/0083242 A1 | 4/2012 | Spitz et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |

(56) References Cited

U.S. PATENT DOCUMENTS

| | | |
|---|---|---|
| 2012/0102202 A1 | 4/2012 | Omar |
| 2012/0108295 A1* | 5/2012 | Schell .............. H04W 4/001 455/558 |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137101 A1 | 5/2012 | Arcese et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0149338 A1 | 6/2012 | Roundtree |
| 2012/0150601 A1 | 6/2012 | Fisher |
| 2012/0154413 A1 | 6/2012 | Kim et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0184367 A1 | 7/2012 | Parrott et al. |
| 2012/0190332 A1 | 7/2012 | Charles |
| 2012/0191536 A1 | 7/2012 | Chen et al. |
| 2012/0196529 A1 | 8/2012 | Huomo et al. |
| 2012/0196586 A1 | 8/2012 | Grigg et al. |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0218084 A1* | 8/2012 | Arponen .............. G06Q 20/322 340/10.5 |
| 2012/0220269 A1* | 8/2012 | Feng .................. H04W 12/08 455/411 |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0262281 A1 | 10/2012 | Edwards et al. |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0282924 A1 | 11/2012 | Tagg et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0297202 A1 | 11/2012 | Gallet et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2012/0329425 A1 | 12/2012 | Velusamy et al. |
| 2013/0003543 A1 | 1/2013 | Ludwig |
| 2013/0010641 A1* | 1/2013 | Dinan .............. H04W 36/0072 370/254 |
| 2013/0014259 A1 | 1/2013 | Gribble et al. |
| 2013/0019323 A1 | 1/2013 | Arvidsson et al. |
| 2013/0031374 A1 | 1/2013 | Thom et al. |
| 2013/0034081 A1 | 2/2013 | Ban et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1 | 3/2013 | Hawkes et al. |
| 2013/0074067 A1 | 3/2013 | Chowdhry |
| 2013/0086385 A1 | 4/2013 | Poeluev |
| 2013/0086684 A1 | 4/2013 | Mohler |
| 2013/0097302 A9 | 4/2013 | Khedouri et al. |
| 2013/0097657 A1 | 4/2013 | Cardamore et al. |
| 2013/0105565 A1 | 5/2013 | Kamprath |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0124583 A1 | 5/2013 | Ferguson et al. |
| 2013/0125114 A1 | 5/2013 | Frascadore |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159021 A1 | 6/2013 | Felsher |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0175984 A1 | 7/2013 | Yamazaki et al. |
| 2013/0191632 A1 | 7/2013 | Spector et al. |
| 2013/0212704 A1 | 8/2013 | Shablygin et al. |
| 2013/0231098 A1 | 9/2013 | Jonas et al. |
| 2013/0260791 A1* | 10/2013 | Malinovskiy .......... H04W 4/02 455/456.1 |
| 2013/0262264 A1 | 10/2013 | Karstoft |
| 2013/0263212 A1 | 10/2013 | Faltyn et al. |
| 2013/0290359 A1* | 10/2013 | Eronen .............. G06F 17/30 707/758 |
| 2013/0290709 A1 | 10/2013 | Muppidi et al. |
| 2013/0310003 A1 | 11/2013 | Sadhvani et al. |
| 2013/0313314 A1 | 11/2013 | Jeng et al. |
| 2013/0331067 A1 | 12/2013 | Coussemaeker et al. |
| 2013/0332456 A1 | 12/2013 | Arkin |
| 2013/0343181 A1 | 12/2013 | Stroud et al. |
| 2013/0347064 A1 | 12/2013 | Aissi |
| 2013/0347103 A1 | 12/2013 | Veteikis et al. |
| 2014/0007182 A1 | 1/2014 | Qureshi et al. |
| 2014/0007222 A1 | 1/2014 | Qureshi et al. |
| 2014/0052562 A1 | 2/2014 | Oliveira et al. |
| 2014/0059642 A1 | 2/2014 | Deasy et al. |
| 2014/0074508 A1 | 3/2014 | Ying et al. |
| 2014/0089243 A1 | 3/2014 | Oppenheimer |
| 2014/0089699 A1 | 3/2014 | O'Connor et al. |
| 2014/0104287 A1 | 4/2014 | Nalluri et al. |
| 2014/0106709 A1 | 4/2014 | Palamara et al. |
| 2014/0118116 A1 | 5/2014 | Lavedas |
| 2014/0141718 A1 | 5/2014 | Stromberg et al. |
| 2014/0155025 A1 | 6/2014 | Parker et al. |
| 2014/0166745 A1* | 6/2014 | Graef .............. G07F 19/202 235/379 |
| 2014/0173747 A1 | 6/2014 | Govindaraju |
| 2014/0188412 A1 | 7/2014 | Mahajan et al. |
| 2014/0188738 A1 | 7/2014 | Huxham |
| 2014/0200051 A1* | 7/2014 | Liu .............. G06K 7/10009 455/566 |
| 2014/0215196 A1 | 7/2014 | Berlin |
| 2014/0245444 A1 | 8/2014 | Lutas et al. |
| 2014/0254381 A1 | 9/2014 | Racz et al. |
| 2014/0267332 A1 | 9/2014 | Chhabra et al. |
| 2014/0279523 A1* | 9/2014 | Lynam .............. G06Q 20/3226 705/44 |
| 2014/0279556 A1 | 9/2014 | Priebatsch et al. |
| 2014/0279558 A1 | 9/2014 | Kadi et al. |
| 2014/0298026 A1 | 10/2014 | Isozaki et al. |
| 2015/0019444 A1 | 1/2015 | Purves |
| 2015/0032976 A1 | 1/2015 | Chapier et al. |
| 2015/0106805 A1 | 4/2015 | Melander et al. |
| 2015/0172928 A1 | 6/2015 | Katzer et al. |
| 2016/0004876 A1 | 1/2016 | Bye et al. |
| 2016/0142396 A1 | 5/2016 | McRoberts et al. |

FOREIGN PATENT DOCUMENTS

| | | |
|---|---|---|
| WO | WO2012064171 A1 | 5/2012 |
| WO | WO2012085593 A1 | 6/2012 |
| WO | WO2013170228 A2 | 11/2013 |
| WO | WO2014004590 A2 | 1/2014 |
| WO | WO2014018575 A2 | 1/2014 |

(56) References Cited

FOREIGN PATENT DOCUMENTS

| | | |
|---|---|---|
| WO | WO2014025687 A2 | 2/2014 |
| WO | WO2014158431 A1 | 10/2014 |

OTHER PUBLICATIONS

FAIPP Pre-Interview Communication dated Mar. 1, 2016, U.S. Appl. No. 13/863,376, filed Apr. 15, 2013.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Notice of Allowance dated Jul. 8, 2014, U.S. Appl. No. 13/802,383, filed Mar. 13, 2013.
FAIPP Pre-Interview Communication dated Feb. 12, 2015, U.S. Appl. No. 14/066,661, filed Oct. 29, 2013.
Notice of Allowance dated Jul. 6, 2015, U.S. Appl. No. 14/066,661, filed Oct. 29, 2013.
Restriction Requirement dated Aug. 14, 2014, U.S. Appl. No. 13/594,777, filed Aug. 25, 2012.
Notice of Allowance dated Dec. 3, 2014, U.S. Appl. No. 13/594,777, filed Aug. 25, 2012.
Notice of Allowance dated Nov. 9, 2015, U.S. Appl. No. 14/659,614, filed Mar. 17, 2015.
FAIPP Pre-Interview Communication dated Jul. 17, 2014, U.S. Appl. No. 13/594,778, filed Aug. 25, 2012.
Notice of Allowance dated Sep. 19, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
First Action Interview Office Action dated Dec. 3, 2014, U.S. Appl. No. 13/594,779, filed Aug. 25, 2012.
Notice of Allowance dated Aug. 14, 2015, U.S. Appl. No. 13/594,779, filed Aug. 25, 2012.
Office Action dated May 5, 2014, U.S. Appl. No. 13/786,450, filed Mar. 5, 2013.
Final Office Action dated Nov. 7, 2014, U.S. Appl. No. 13/786,450, filed Mar. 5, 2013.
Notice of Allowance dated Feb. 26, 2015, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
Notice of Allowance dated Sep. 26, 2014, U.S. Appl. No. 13/831,486, filed Mar. 14, 2013.
FAIPP Pre-Interview Communication dated Nov. 7, 2014, U.S. Appl. No. 13/802,404, filed Mar. 13, 2013.
First Action Interview Office Action dated Apr. 7, 2015, U.S. Appl. No. 13/802,404, filed Mar. 13, 2013.
Final Office Action dated Aug. 27, 2015, U.S. Appl. No. 13/802,404, filed Mar. 13, 2013.
Advisory Action dated Nov. 16, 2015, U.S. Appl. No. 13/802,404, filed Mar. 13, 2013.
FAIPP Pre-Interview Communication dated Dec. 16, 2014, U.S. Appl. No. 13/898,435, filed May 20, 2013.
Notice of Allowance dated Feb. 20, 2015, U.S. Appl. No. 13/898,435, filed May 20, 2013.
FAIPP Pre-Interview Communication dated Mar. 26, 2015, U.S. Appl. No. 13/939,175, filed Jul. 10, 2013.
Notice of Allowance dated Jul. 7, 2015, U.S. Appl. No. 13/939,175, filed Jul. 10, 2013.
FAIPP Pre-Interview Communication dated Oct. 29, 2014, U.S. Appl. No. 13/844,282, filed Mar. 15, 2013.
Final Office Action dated Mar. 24, 2015, U.S. Appl. No. 13/844,282, filed Mar. 15, 2013.
Advisory Action dated Jun. 10, 2015, U.S. Appl. No. 13/844,282, filed Mar. 15, 2013.
Office Action dated Aug. 24, 2015, U.S. Appl. No. 13/844,282, filed Mar. 15, 2013.
Notice of Allowance dated Feb. 26, 2016, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Notice of Allowance dated Dec. 19, 2014, U.S. Appl. No. 13/844,325, filed on Mar. 15, 201.
Notice of Allowance dated Jan. 2, 2015, U.S. Appl. No. 13/831,463, filed Mar. 14, 2013.
FAIPP Pre-Interview Communication dated Mar. 24, 2015, U.S. Appl. No. 13/964,112, filed Aug. 12, 2013.
Notice of Allowance dated Aug. 3, 2015, U.S. Appl. No. 13/964,112, filed Aug. 12, 2013.
Restriction Requirement dated Jan. 12, 2016, U.S. Appl. No. 13/912,190, filed Jun. 6, 2013.
FAIPP Pre-Interview Communication dated Mar. 11, 2016, U.S. Appl. No. 13/912,190, filed Jun. 6, 2013.
FAIPP Pre-Interview Communication dated Apr. 15, 2015, U.S. Appl. No. 14/085,474, filed Nov. 20, 2013.
Notice of Allowance dated May 29, 2015, U.S. Appl. No. 14/085,474, filed Nov. 20, 2013.
FAIPP Pre-Interview Communication dated Feb. 4, 2015, U.S. Appl. No. 14/075,663, filed Nov. 8, 2013.
First Action Interview Office Action dated Apr. 10, 2015, U.S. Appl. No. 14/075,663, filed Nov. 8, 2013.
Notice of Allowance dated Jul. 1, 2015, U.S. Appl. No. 14/075,663, filed Nov. 8, 2013.
FAIPP Pre-Interview Communication dated Feb. 24, 2015, U.S. Appl. No. 14/163,047, filed Jan. 24, 2014.
Notice of Allowance dated Apr. 9, 2015, U.S. Appl. No. 14/163,047, filed Jan. 24, 2014.
Notice of Allowance dated Jul. 22, 2015, U.S. Appl. No. 14/229,532, filed Mar. 28, 2014.
Notice of Allowance dated Aug. 28, 2015, U.S. Appl. No. 14/446,330, filed Jul. 29, 2014.
FAIPP Pre-Interview Communication dated Nov. 18, 2015, U.S. Appl. No. 14/681,077, filed Apr. 7, 2015.
European Examination Report dated Mar. 3, 2016, EPC Application Serial No.
Notice of Allowance dated May 2, 2016, U.S. Appl. No. 13/863,376, filed Apr. 15, 2013.
Office Action dated May 17, 2016, U.S. Appl. No. 13/802,404, filed Mar. 13, 2013.
First Action Interview Office Action dated Mar. 28, 2016, U.S. Appl. No. 14/681,077, filed Apr. 7, 2015.
Notice of Allowance dated Mar. 26, 2016, U.S. Appl. No. 13/857,139, filed Apr. 4, 2013.
Notice of Allowance dated Apr. 22, 2016, U.S. Appl. No. 13/873,813, filed Apr. 30, 2013.
Notice of Allowance dated Jun. 1, 2016, U.S. Appl. No. 14/192,316, filed Feb. 27, 2014.
Notice of Allowance dated Mar. 24, 2016, U.S. Appl. No. 14/532,954, filed Nov. 4, 2014.
Paczkowski, Lyle W., et al., "Trusted Code Generation and Verification to Prevent Fraud from Maleficent External Devices that Capture Data," filed Jan. 14, 2015, U.S. Appl. No. 14/596,218.
Marquardt, et al., "Infrastructure for Secure Short Message Transmission," filed Apr. 7, 2015, U.S. Appl. No. 14/681,077.
Cordes, Kevin R., et al., "Digest of Biographical Information for an Electronic Device with Static and Dynamic Portions," filed Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device," filed Apr. 4, 2013, U.S. Appl. No. 13/857,139.
Cordes, Kevin R., et al., "Prevention of Inductive Coupling Between Components of a Mobile Communication Device ," filed Apr. 30, 2013, U.S. Appl. No. 13/873,813.
Cordes, Kevin R., et al., "Autonomous Authentication of a Reader by a Radio Frequency Identity (RFID) Device," filed Feb. 27, 2014, U.S. Appl. No. 14/192,316.

(56) References Cited

OTHER PUBLICATIONS

Loman, Clint H., et al., "Radio Frequency Induced Power Reception Management for a Radio Frequency Identity (RFID) Chip Embedded in a Mobile Communication Device," filed Nov. 4, 2014, U.S. Appl. No. 14/532,954.
Cordes, Kevin R., et al., entitled, "Virtual Private Network (VPN) Tunneling in a User Equipment (UE) Brokered by a Radio Frequency Identity (RFID) Chip Communicatively Coupled to the User Equipment," filed Apr. 27, 2015, U.S. Appl. No. 14/696,835.
European Examination Report dated Jun. 1, 2016, EPC Application Serial No. 14775613.4, filed on Jul. 8, 2015.
Office Action dated Aug. 25, 2016, U.S. Appl. No. 13/860,338, filed Apr. 10, 2013.
Notice of Allowance dated Aug. 24, 2016, U.S. Appl. No. 13/912,190, filed Jun. 6, 2013.
FAIPP Pre-Interview Communication dated Aug. 8, 2016, U.S. Appl. No. 14/596,218, filed Jan. 14, 2015.
Notice of Allowance dated Jun. 15, 2016, U.S. Appl. No. 14/681,077, filed Apr. 7, 2015.
Eastlake, 3rd Motorola labs T Hansen AT&T Labs D: "US Secure Hash Algorithms," MPEG Meeting Mar. 16, 2011 to Mar. 23, 2011, Geneva, XP15047395A, ISSN: 0000-0003.
Hamdare, Safa, et al., "Securing SMS Based One Time Password Technique from Man in the Middle Attach," IJETT, vol. 11 Issue 3, May 2014.
Cordes, Kevin R., et al., "Prevention of Inductive Coupling Between Components of a Mobile Communication Device ," filed Jul. 8, 2016, U.S. Appl. No. 15/206,002.
FAIPP Pre-Interview Communication dated Aug. 5, 2015, U.S. Appl. No. 13/857,141, filed Apr. 4, 2013.
Notice of Allowance dated Dec. 17, 2015, U.S. Appl. No. 13/857,141, filed Apr. 4, 2013.
Restriction Requirement dated Jan. 5, 2015, U.S. Appl. No. 13/857,139, filed Apr. 4, 2013.
FAIPP Pre-Interview Communication dated Jun. 2, 2015, U.S. Appl. No. 13/857,139, filed Apr. 4, 2013.
Office Action dated Nov. 19, 2015, U.S. Appl. No. 13/857,139, filed Apr. 4, 2013.
FAIPP Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
Notice of Allowance dated Jun. 11, 2015, U.S. Appl. No. 13/857,138, filed Apr. 4, 2013.
FAIPP Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Notice of Allowance dated Jan. 28, 2014, U.S. Appl. No. 12/486,873, filed Jun. 18, 2009.
Restriction Requirement dated Jul. 31, 2015, U.S. Appl. No. 13/873,813, filed Apr. 30, 2013.
Office Action dated Nov. 2, 2015, U.S. Appl. No. 13/873,813, filed Apr. 30, 2013.
Office Action dated Nov. 4, 2014, U.S. Appl. No. 14/076,164, filed Nov. 8, 2013.
Notice of Allowance dated Mar. 6, 2015, U.S. Appl. No. 14/076,164, filed Nov. 8, 2013.
Office Action dated Jul. 9, 2015, U.S. Appl. No. 14/732,846, filed Jun. 8, 2015.
Notice of Allowance dated Oct. 29, 2015, U.S. Appl. No. 14/732,846, filed Jun. 8, 2015.
FAIPP Pre-Interview Communication dated Feb. 25, 2016, U.S. Appl. No. 14/192,316, filed Feb. 27, 2014.
FAIPP Pre-Interview Communication dated Dec. 30, 2015, U.S. Appl. No. 14/532,954, filed Nov. 4, 2014.

Zimmerman, Ann, "Check Out the Future of Shopping", The Wall Street Journal, Business, May 18, 2011, http://online.wsj,com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Foreign Communication from a Related Counterpart—International Search Report and Written Opinion, dated Dec. 2, 2013, PCT/US13/40673, filed on May 10, 2013.
Foreign Communication from a Related Counterpart—International Preliminary Report on Patentability, dated Nov. 20, 2014, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 1, 2014, PCT/US13/47729, filed on Jun. 25, 2013.
Foreign Communication from a Related Counterpart—International Preliminary Report on Patentability, dated Jan. 3, 2015, PCT/US13/47729, filed on Jun. 25, 2013.
Foreign Communication from a Related Counterpart—International Search Report and Written Opinion, dated Apr. 22, 2014, PCT/US13/53617, filed on Aug. 5, 2013.
Foreign Communication from a Related Counterpart—International Preliminary Report on Patentability, dated Feb. 19, 2015, PCT/US13/53617, filed on Aug. 5, 2013.
Foreign Communication from a Related Counterpart—International Search Report and Written Opinion, dated Feb. 1, 2014, PCT/US13/51750, filed on Jul. 24, 2013.
Foreign Communication from a Related Counterpart—International Preliminary Report on Patentability, dated Feb. 5, 2015, PCT/US13/51750, filed on Jul. 24, 2013.
Foreign Communication from a Related Counterpart—International Search Report and Written Opinion, dated Jul. 11, 2014, PCT/US14/16651, filed on Feb. 16, 2014.
Foreign Communication from a Related Counterpart—International Preliminary Report on Patentability, dated Sep. 24, 2015, PCT/US14/16651, filed on Feb. 16, 2014.
Ahmed, Farid, et al., "Correlation-based Watermarking Method for Imagine Authentication Applications", Society of Photo-Optical Instrumentation Engineers, Feb. 17, 2004, pp. 1834-1838.
Perrig, Adrian, et al., "SPINS: Security Protocols for Sensor Networks," ACM, Sep. 2002, vol. 8, pp. 521-531.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.
Lee, Jeremy, et al., "A Low-Cost Solution for Protecting IPs Against Scan-Based Side Channel Attacks," 24th IEEE VLSI Test Symposium. Pub. Date: 2006. http//ieeexplore. ieee. org/stamp/stamp.jsp?tp=&arnumber= 1617569.
Henderson, Tristan, et al., "On the Wire, Congestion Pricing: Paying Your Way in Communications Networks,". University College London, Sep./Oct. 2001, retrieved from: http://tristan.host.cs.st-andrews.ac.uK!research/pubs/ieeeic01.pdf.
Dietrich, Kurt, et al., "Implementation Aspects of Mobile and Embedded Trusted Computing," Institute for Applied Information Processing and Communications, Trusted Computing Interaction Conference, 2009.
McRoberts, Leo Michael, et al., "End-to-End Trusted Communications Infrastructure," filed Jan. 25, 2016, U.S. Appl. No. 15/005,123.
Bye, Stephen James, et al., "Protection for Multimedia Files Pre-Downloaded to a Mobile Device," filed Apr. 15, 2013, U.S. Appl. No. 13/863,376.

(56) References Cited

OTHER PUBLICATIONS

Bertz, Lyle T., et al., "Framework for Real-Time Brokering of Digital Content Delivery," filed Mar. 17, 2015, U.S. Appl. No. 14/659,614.
Paczkowski, Lyle W., et al., "Trusted Security Zone Enhanced with Trusted Hardware Drivers," filed Mar. 13, 2013, U.S. Appl. No. 13/802,404.
Paczkowski, Lyle W., et al., "Restricting Access of a Portable Communication Device to Confidential Data or Applications via a Remote Network Based on Event Triggers Generated by the Portable Communication Device," filed Mar. 15, 2013, U.S. Appl. No. 13/844,282.
Bye, Stephen James, et al., "Delivering Digital Content to a Mobile Device via a Digital Rights Clearing House", filed Apr. 10, 2013, U.S. Appl. No. 13/860,338.
McCracken, Billy Gene, Jr., et al. "Mobile Communication Device Profound Identity Brokering Framework", filed Jun. 6, 2013, U.S. Appl. No. 13/912,190.
Neson, Tracy L., et al., "Mated Universal Serial Bus (USB) Wireless Dongles Configured with Destination Addresses," filed Jan. 26, 2015, U.S. Appl. No. 14/606,011.
FAIPP Pre-Interview Communication dated Mar. 20, 2014, U.S. Appl. No. 13/482,731, filed May 29, 2012.
Notice of Allowance dated May 27, 2014, U.S. Appl. No. 13/482,731, filed May 29, 2012.
FAIPP Pre-Interview Communication dated Oct. 24, 2012, U.S. Appl. No. 13/463,797, filed May 3, 2012.
Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
Final Office Action dated Sep. 9, 2013, U.S. Appl. No. 13/440,980, filed Apr. 5, 2012.
Notice of Allowance dated Nov. 29, 2013, U.S. Appl. No. 13/440,980, filed Apr. 5, 2012.
FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
FAIPP Pre-Interview Communication dated Jul. 25, 2013, U.S. Appl. No. 13/470,203, filed May 11, 2012.
Final Office Action dated Mar. 27, 2014, U.S. Appl. No. 13/470,203, filed May 11, 2012.
Advisory Action dated May 29, 2014, U.S. Appl. No. 13/470,203, filed May 11, 2012.
Office Action dated Aug. 29, 2014, U.S. Appl. No. 13/470,203, filed May 11, 2012.
Notice of Allowance dated Dec. 22, 2014, U.S. Appl. No. 13/470,203, filed May 11, 2012.
FAIPP Pre-Interview Communication dated Jul. 2, 2015, U.S. Appl. No. 14/632,850, filed Feb. 26, 2015.
Final Office Action dated Nov. 6, 2015, U.S. Appl. No. 14/632,850, filed Feb. 26, 2015.
Advisory Action dated Jan. 29, 2016, U.S. Appl. No. 14/632,850, filed Feb. 26, 2015.
FAIPP Pre-Interview Communication dated May 12, 2014, U.S. Appl. No. 13/294,177, filed Nov. 11, 2011.
Notice of Allowance dated Oct. 8, 2014, U.S. Appl. No. 13/294,177, filed Nov. 11, 2011.
FAIPP Pre-Interview Communication dated Mar. 25, 2015, U.S. Appl. No. 13/532,588, filed Jun. 25, 2012.
FAIPP Office Action Sep. 15, 2015, U.S. Appl. No. 13/532,588, filed Jun. 25, 2012.
Notice of Allowance dated Nov. 5, 2015, U.S. Appl. No. 13/532,588, filed Jun. 25, 2012.
Supplemental Notice of Allowance dated Nov. 16, 2015, U.S. Appl. No. 13/532,588, filed Jun. 25, 2012.
FAIPP Pre-Interview Communication dated Sep. 25, 2014, U.S. Appl. No. 13/533,969, filed Jun. 27, 2012.
Notice of Allowance dated Feb. 5, 2015, U.S. Appl. No. 13/533,969, filed Jun. 27, 2012.
NAIPP Pre-Interview Communication dated Jun. 6, 2013, U.S. Appl. No. 13/571,348, filed Aug. 10, 2012.
Office Action dated Sep. 25, 2013, U.S. Appl. No. 13/571,348, filed Aug. 10, 2012.
Final Office Action dated Apr. 10, 2014, U.S. Appl. No. 13/571,348, filed Aug. 10, 2012.
Advisory Action dated Jun. 23, 2014, U.S. Appl. No. 13/571,348, filed Aug. 10, 2012.
Office Action dated Dec. 15, 2014, U.S. Appl. No. 13/571,348, filed Aug. 10, 2012.
Notice of Allowance dated Jun. 17, 2015, U.S. Appl. No. 13/571,348, filed Aug. 10, 2012.
Restriction Requirement dated Jan. 2, 2015, U.S. Appl. No. 13/762,319, filed Feb. 7, 2013.
FAIPP Pre-Interview Communication dated Mar. 10, 2015, U.S. Appl. No. 13/762,319, filed Feb. 7, 2013.
Notice of Allowance dated Jun. 9, 2015, U.S. Appl. No. 13/762,319, filed Feb. 7, 2013.
Notice of Allowance dated Aug. 30, 2013, U.S. Appl. No. 13/540,437, filed Jul. 2, 2012.
NAIPP Pre-Interview Communication dated May 21, 2015, U.S. Appl. No. 14/090,667, filed Nov. 26, 2013.
Notice of Allowance dated Aug. 4, 2015, U.S. Appl. No. 14/090,667, filed Nov. 26, 2013.
Restriction Requirement dated Nov. 1, 2013, U.S. Appl. No. 13/557,213, filed Jul. 25, 2012.
Office Action dated Dec. 19, 2013, U.S. Appl. No. 13/557,213, filed Jul. 25, 2012.
Notice of Allowance dated Jun. 4, 2014, U.S. Appl. No. 13/557,213, filed Jul. 25, 2012.
NAIPP Pre-Interview Communication dated Nov. 27, 2013, U.S. Appl. No. 13/610,856, filed Sep. 11, 2012.
Notice of Allowance dated Jan. 31, 2014, U.S. Appl. No. 13/610,856, filed Sep. 11, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
Notice of Allowance dated Oct. 16, 2013, U.S. Appl. No. 13/556,200, filed Jul. 24, 2012.
Notice of Allowance dated Sep. 21, 2015, U.S. Appl. No. 14/148,714, filed Jan. 6, 2014.
FAIPP Pre-Interview Communication dated Aug. 4, 2014, U.S. Appl. No. 13/844,357, filed Mar. 15, 2013.
Notice of Allowance dated Oct. 6, 2014, U.S. Appl. No. 13/844,357, filed Mar. 15, 2013.
FAIPP Pre-Interview Communication dated Nov. 12, 2014, U.S. Appl. No. 13/844,145, filed Mar. 15, 2013.
Final Office Action dated Apr. 7, 2015, U.S. Appl. No. 13/844,145, filed Mar. 15, 2013.
Examiner's Answer dated Nov. 16, 2016, U.S. Appl. No. 14/632,850, filed Feb. 26, 2015.
Notice of Allowance dated Nov. 18, 2016, U.S. Appl. No. 13/802,404, filed Mar. 13, 2013.
Notice of Allowance dated Oct. 21, 2016, U.S. Appl. No. 14/696,835, filed Apr. 27, 2015.
McCracken, Billy Gene, Jr., et al. "Mobile Communication Device Profound Identity Brokering Framework", filed Nov. 30, 2016, U.S. Appl. No. 15/365,934.
FAIPP Pre-Interview Communication dated Mar. 21, 2017, U.S. Appl. No. 14/855,364, filed Sep. 15, 2015.
European Examination Report dated Feb. 14, 2017, EPC Application Serial No. 14775613.4, filed on Jul. 8, 2015.
Final Office Action dated Mar. 9, 2017, U.S. Appl. No. 13/860,338, filed Apr. 10, 2013.
FAIPP Office Action dated Apr. 5, 2017, U.S. Appl. No. 14/596,218, filed Jan. 14, 2015.
Office Action dated Jan. 11, 2017, U.S. Appl. No. 15/206,002, filed Jul. 8, 2016.

\* cited by examiner

DIGEST OF BIOGRAPHICAL INFORMATION FOR AN ELECTRONIC DEVICE WITH STATIC AND DYNAMIC PORTIONS

CROSS-REFERENCE TO RELATED APPLICATIONS

This application is a divisional of and claims priority under 35 U.S.C. §119 to U.S. patent application Ser. No. 13/857,141, filed on Apr. 4, 2013, entitled "Digest of Biographical Information of an Electronic Device with Static and Dynamic Portions," by Kevin R. Cordes, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices have become ubiquitous among people living in nations with developed economies. When a problem occurs, a mobile communication device may be serviced by customer care representatives, for example by a representative in a retail outlet that sells mobile communication devices. Information about the original manufacturing of the device, the initial configuration of the device, and/or the current configuration of the device may desirably be determined to assist a representative in troubleshooting and/or repairing the device. Some mobile communication devices provide such manufacturing and initial configuration information encoded in graphics, for example bar codes, that are affixed to the device, for example inside a battery compartment and behind a battery of the device. Other information about the current configuration of the mobile communication device may be looked up or accessed from a data base via a work station operated by the representative, for example by providing information identifying the subject device such as an electronic serial number (ESN), a mobile station identity (MSID), a phone number, or other identifying information obtained from the graphics affixed inside the battery compartment and/or provided by a user of the device.

A mobile communication device, for example a mobile phone, may pass through a number of states from initial manufacturing to termination of the device, for example when melted down to harvest precious metals. A device may be provided to a first owner and activated for wireless communication services. The device may be deactivated and returned to a refurbishing center. The device may then be provided to a second owner and activated for wireless communication services, possibly services associated with a different brand or service provider. The device may cycle through these states any number of times. Ultimately the device may be deactivated and terminated.

SUMMARY

In an embodiment, a method of managing a lifecycle of a mobile communication device is disclosed. The method comprises storing a biographical digest in a radio frequency identity chip of a mobile communication device at the time of manufacture of the communication device. The biographical digest comprises a static portion and a dynamic portion. The static portion comprises an identity of a model of the device, an identity of a manufacturer of the device, an identity of a location where the device was manufactured, and an identity of an initial software version of the device and wherein the static portion is write disabled by the manufacturer of the device. The dynamic portion comprises an identity of a current software version of the device and an identity of a device status having a value of new and wherein the dynamic portion is write enabled by the manufacturer of the device. The method further comprises activating the device for wireless communication service, after activating the device, deactivating the device for wireless communication service, and after deactivating the device, writing the device status of the dynamic portion of the biographical digest in the radio frequency identity chip of the device to a value of dead. This method may promote preventing the device from being activated for wireless communication service after once having the device status of the dynamic portion of the biographical digest in the radio frequency identity chip of the device written to the dead value.

In another embodiment, a method of performing customer service on a mobile communication device is disclosed. The method comprises reading a biographical digest from a radio frequency identity chip of a mobile communication device by a near field communication (NFC) scanner. The method further comprises, based on reading the biographical digest, determining by a computer system coupled to the near field communication scanner at least three items of information about the device selected from a location where the device was manufactured, an initial software version installed in the device by the manufacturer, a current preferred roaming list (PRI) stored in the device, a current software version installed in the device, an activation date of the device, a phone number of the device, an international mobile station equipment identity (IMEI) of the device, and a mobile equipment identity (MEID) of the device. The method further comprises, based on the at least three items of information about the device determined by the computer system, providing customer service to a user of the mobile communication device. This method may promote improving customer satisfaction with customer service.

In another embodiment, a method of storing and accessing a biographical digest on a mobile communication device is disclosed. The method comprises combining a plurality of items of biographical device information into a biographical digest, wherein the items of biographical information comprise at least three items of information selected from a federal communications commission (FCC) identity, a model identity, a hardware version identity, a manufacturer identity, a country of manufacture, a date of manufacture, a location of manufacture, an initial software version identity, an initial preferred roaming list (PRL) version identity, a secure element (SE) key, a trusted security zone master key, an initial stock keeping unit (SKU) identity, an initial universal product code (UPC) identity, a current preferred roaming list identity, a current software version identity, a current stock keeping unit identity, a current universal product code identity, a device status, a device activation date, a phone number of the device, a current international mobile station equipment identity (IMEI) of the device, and a current mobile equipment identity (MEID) of the device. The method further comprises writing the biographical digest to a radio frequency identity (RFID) chip of the mobile communication device, wherein a portion of the biographical digest is maintained in a static state in the radio frequency identity chip and a portion the biographical digest is maintained in a dynamic state in the radio frequency identity chip. The method further comprises reading the biographical digest from the radio frequency identity chip of the mobile device by a near field communication (NFC) scanner device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
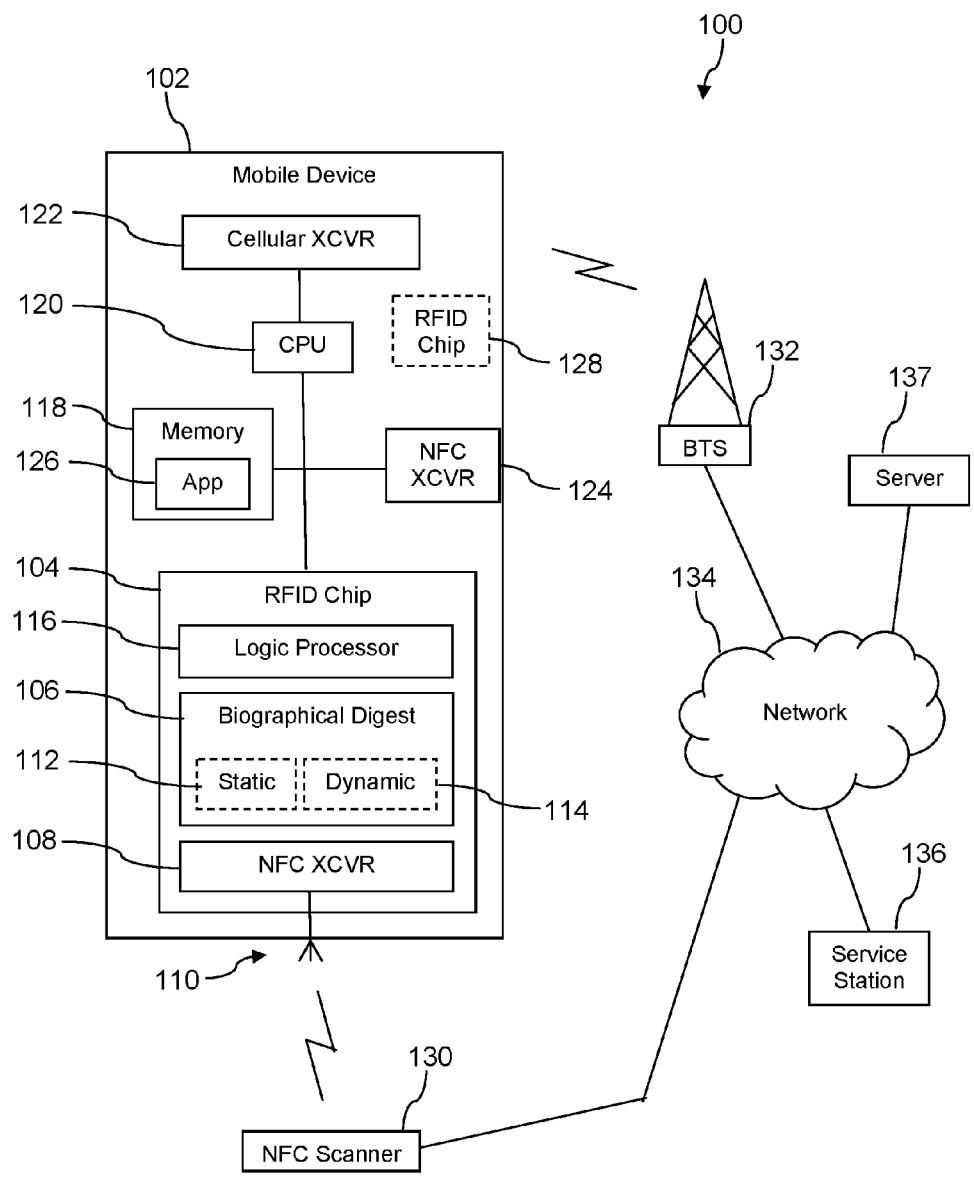
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Obtaining information about a mobile communication device may be desirable at numerous points in the life of the device. It is useful to be able to quickly and automatically identify and determine manufacturing information and configuration information about devices in a distribution center or order fulfillment center, for example to quickly scan all the devices stored in a master carton on a palette in a warehouse. It is useful to be able to quickly and automatically identify and determine manufacturing information and configuration information about devices in a customer service environment, for example in a retail store where wireless communication subscribers might take their device to have a problem diagnosed and repaired.

In the case of determining information about a device at a retail store, devices in the past often provided some of this information in one or more bar codes under the removable battery. Devices, however, are evolving to non-removable batteries (that is, not removable by an end user or a customer service representative in a retail store), and providing a bar code behind the battery cover may not be useful to customer service representatives in determining this information under those circumstances. Putting the graphical information on an exterior of the device is not an aesthetically acceptable alternative. It is understood that quickly and automatically determining this information about mobile communication devices from a sizeable assemblage of devices in a shipping box on a palette in a warehouse may not be practicable using the bar coded information. Additionally, even in the current system employing bar codes that are readily accessible, the bar codes may be smudged or torn over time and hence may not be readable by a bar code scanner. When a store employee attempts to enter in the bar code number manually, for example by typing the numbers in using a keyboard, the employee may make errors. Even if no errors occur while entering the bar code number, the process may be slow and tedious, diminishing the customer satisfaction with the retail store and/or the wireless service provider or brand associated with the mobile communication device.

The present disclosure teaches a new system for making this information about a mobile communication device easily and automatically available for scanning. Note that bar codes may continue to be provided in an interior of the mobile communication device, notwithstanding the teachings of the present disclosure, as a back-up measure. The information may be stored in a radio frequency identity (RFID) chip coupled to the device. The information stored in the RFID chip may include information about the manufacturing of the device, information about an initial configuration of the device, as well as information about a current configuration of the device. In an embodiment, the information stored in the RFID chip is not used to drive the behavior of the device, as for example applications on the device reading from the RFID chip to select between different execution paths based on the read parameter values. It is contemplated that the applications instead will read parameters stored in conventional memory of the device to determine their execution paths and that the information stored in the RFID chip will be read by external scanners.

This information may be referred to as a biographical digest. As the device is modified, for example as a new preferred roaming list (PRL) is configured into a mobile phone, the RFID chip information may be correspondingly updated to remain current and accurate. The information stored in the RFID chip may be read by an appropriate scanning device even when the device is turned off, when the battery of the device is depleted, or when the battery of the device is not installed, as for example when the device is stowed in its original shipping box and the battery is not installed prior to initial distribution to a user. For example, a near field communication (NFC) scanner may radiate an energizing radio field from which the RFID chip may derive energizing power, even when no power is provided to the RFID chip from a battery in the device. The information stored in the RFID chip brings together in one location information that may currently be stored in separate disparate memory locations in the mobile communication device and/or distributed across multiple separate systems.

The RFID chip may be adhered to an external or internal surface of the mobile communication device or encapsulated within a component of the device, for example encapsulated within a button of the device. The RFID chip may be electrically isolated from the electrical components of the device, for example electrically isolated from a motherboard of the device. Alternatively, the RFID chip may be electrically coupled to the device, for example wired to receive power from a battery of the device, at least in some modes of operation, and wired to be communicatively coupled to a processor of the device and/or to a data bus, to an address bus, and/or to a memory bus of the device. For further details about an RFID chip electrically coupled to the mobile communication device, see U.S. patent application Ser. No. 13/857,139, filed Apr. 4, 2013, entitled "Radio Frequency Identity (RFID) Chip Electrically and Communicatively Coupled to Motherboard of Mobile Communication Device," by Kevin R. Cordes, et al., which is incorporated by reference herein in its entirety.

In an embodiment, the RFID chip may be read from by an NFC scanner or other near field communication device and written to by the processor and/or the data bus of the device. For example, in an embodiment, the processor may assert one or more addresses mapped to the RFID chip on an address bus of the device and write to memory storage within the RFID chip over a data bus of the device.

The information about the mobile communication device stored in the RFID chip is desirably partitioned into a static portion and a dynamic portion. The static portion contains information that does not change over the entire lifecycle of the device, for example an identity of a manufacturer of the device, a location of manufacturing of the device, an initial hardware version of the device, an initial software version of the device, and the like. The dynamic portion contains information that may change over the lifecycle of the device, for example a current hardware version of the device, a current software version of the device, a current preferred roaming list (PRL) of the device, a phone number of the device, a lifecycle state of the device, and the like. At the end of the life of the device, the dynamic portion may also be rendered non-writeable to prevent further writing and/or modification of the dynamic portion The use of an RFID chip to store the information about the mobile communication device described in summary above can provide a number of advantages. A number of mobile communication devices may be scanned quickly and automatically through a master carton containing the mobile communication devices in their individual shipping boxes (with no battery installed in the devices) in a distribution center and/or fulfillment center. A mobile communication device presented for service at a retail store can be quickly and automatically scanned to obtain information useful for providing customer service. When the mobile communication device is returned for refurbishment or for final disposal, a device status of "refurbish" or "terminate" may be written to the RFID chip from an NFC scanner/writer. A mobile communication device having a "terminate" device status written in its RFID chip may be prevented from reactivation.

Turning now to FIG. 1, a system 100 is described. In an embodiment, system 100 comprises a mobile communication device 102. The mobile communication device 102 comprises a radio frequency identity (RFID) chip 104 that comprises a biographical digest 106, a near field communication (NFC) transceiver 108, an RFID antenna 110, and a logic processor 116. In an embodiment, the RFID chip 104 is connected or communicatively coupled to a mother board or circuit board of the mobile device 102 and is connected or communicatively coupled to one or more of a memory bus, a data bus, and/or an address bus of the mother board.

The mobile communication device 102 may further comprise a memory 118, a central processing unit (CPU) 120, a cellular transceiver 122, and a general purpose near field communication transceiver 124. The biographical digest 106 may be abstractly considered to be part of the memory 118 or part of the memory map of the mobile communication device 102, because the biographical digest 106, via the mediation of an application 126, may be addressable on an address bus and readable via a data bus and/or memory bus of the mobile communication device 102.

The general purpose NFC transceiver 124 may be used for completing point-of-sale (POS) transactions, for obtaining access to a building via a handshake with an electronic entry scanner, for paying mass transit system fares, and for other transactions or exchanges of confidential information associated with application layer functionality visible to a user of the device 102.

In an embodiment, the RFID chip 104 that is connected or communicatively coupled to the mother board or circuit board of the device 102 is not present and instead the mobile device 102 further comprises an isolated radio frequency identity chip 128. The isolated RFID chip 128 may be adhered to an outer or inner surface of the package of the device 102 and/or retained by a component of the device 102, for example retained by a control button. The isolated RFID chip 128 has an internal structure substantially like that of the RFID chip 104. The isolated RFID chip 128 may have a processor, biographical digest comprising a static portion and a dynamic portion, a near field communication transceiver, and an antenna substantially similar to the corresponding components in the RFID chip 104. It is understood that the description of the functionality of the RFID chip 104 below applies substantially to the isolated RFID chip 128, and where there are substantive differences with the function and/or configuration of the RFID chip 104, these differences are described separately for the isolated RFID chip 128.

The cellular transceiver 122 may communicate with a network 134 via a wireless communication link that may be established with a base transceiver station 132 that is communicatively coupled to the network 134. The wireless communication link may be established in accordance with any of a code division multiple access (CDMA) wireless protocol, a global system for mobile communication (GSM) wireless protocol, a long term evolution (LTE) wireless protocol, a worldwide interoperability for microwave access (WiMAX) wireless protocol, or other cellular communication wireless protocol. The wireless communication link between the cellular transceiver 122 and the base transceiver station 132 may support voice communication and/or data communication. These communication modes may include voice-to-voice communication, short message service (SMS) communication, multimedia message service (MMS) communication, email communication, HTTP communication such as retrieving hypertext markup language (HTML) content from a web server or other content server.

The network 134 may comprise one or more private networks, one or more public networks, and/or a combination thereof. It is understood that the system 100 may comprise any number of base transceiver stations 132 and any number of mobile devices 102. In an embodiment, a service station 136 such as a retail store clerk work station or a customer care work station may be communicatively coupled to the network 134. In an embodiment, a server computer 137 may be coupled to the network 134 and able to communicate to the mobile communication device 102 via the network 134 and the base transceiver station 132.

In an embodiment, a near field communication (NFC) scanner 130 may be communicatively coupled to the network 134. The NFC scanner 130 may provide an energizing radio field to activate and/or provide power to the RFID chip 104 and may read information from the RFID chip 104, for example may read the biographical digest 106 and/or the information contained in the biographical digest 106 from the RFID chip 104. The NFC scanner 130 communicates with the RFID chip 104 using near field communications. As used herein, near field communications employed by the NFC scanner 130 may be limited to relatively short distance, for example less than about 20 inches or less than about 10 inches. At the same time, the present disclosure contemplates use of a NFC scanner 130 that may communicate using stronger fields that are effective over greater distances and/or that are able to penetrate cardboard master shipping cartons and/or individual shipping containers for mobile communication devices. Because the NFC scanner 130 may provide the energizing radio field, the RFID chip 104 may be scanned by the NFC scanner 130 even when the mobile communication device 102 is turned off, when a battery (not shown) of the device 102 is not installed, and/or when the battery of the device 102 is discharged. In an embodiment, the NFC scanner 130 may be able to write into a storage location of the RFID chip 104 that is separate from the biographical digest 106, and the application 126 may read the information written into the storage location of the RFID chip 104 by the NFC scanner 130.

In an embodiment, the biographical digest 106 comprises information about the mobile communication device 102, for example a manufacturer identity, a device model identity, an initial hardware version identity, an initial software version identity, an initial preferred roaming list identity, a current software version identity, a current preferred roaming list identity, and other information about the device 102. The biographical digest 106 may comprise a static portion 112 and a dynamic portion 114. The biographical digest 106 may be stored in a memory portion of the RFID chip 104, for example a semiconductor memory portion.

In an embodiment, the memory area corresponding to the static portion 112 may be physically separated from the memory area corresponding to the dynamic portion 114. Alternatively, the static portion 112 and the dynamic portion 114 may not be physically separated, but the write functionality of the static portion 112 may be separately configured and/or controlled from the write functionality of the dynamic portion 114. In either case, the separation of the memory area corresponding to the static portion 112 from the memory area corresponding to the dynamic portion 114 may be referred to as bifurcated memory or a bifurcation of at least a portion of the memory storage of the RFID chip 104.

After the static portion 112 is written to, for example upon completion of the manufacturing cycle of the device 102, the write functionality for the static portion 112 may be disabled, for example by blowing fuses in the write lines associated with the static portion 112 while leaving intact the fuses in the corresponding write lines associated with the dynamic portion 114. The fuses in the write lines associated with the dynamic portion 114 may be blown at an end of a lifecycle of the device 102, for example when the device has transitioned to a dead or terminated status. Alternatively, the writing to the static portion 112 may be prevented by a biographical digest software layer and/or application, for example an application 126 described further hereinafter, that mediates write access to the static portion 112. In an embodiment, the static portion 112 may be partially written to after the initial writing, for example in the case where some or all of the static information is stored in memory 106 that has experienced a hardware failure. The hardware failure may be detected, for example by an application 126 described below, and the static portion 112 rewritten, possibly mapped into a different portion of the static portion 112 to avoid the failed memory locations.

Figure 2:
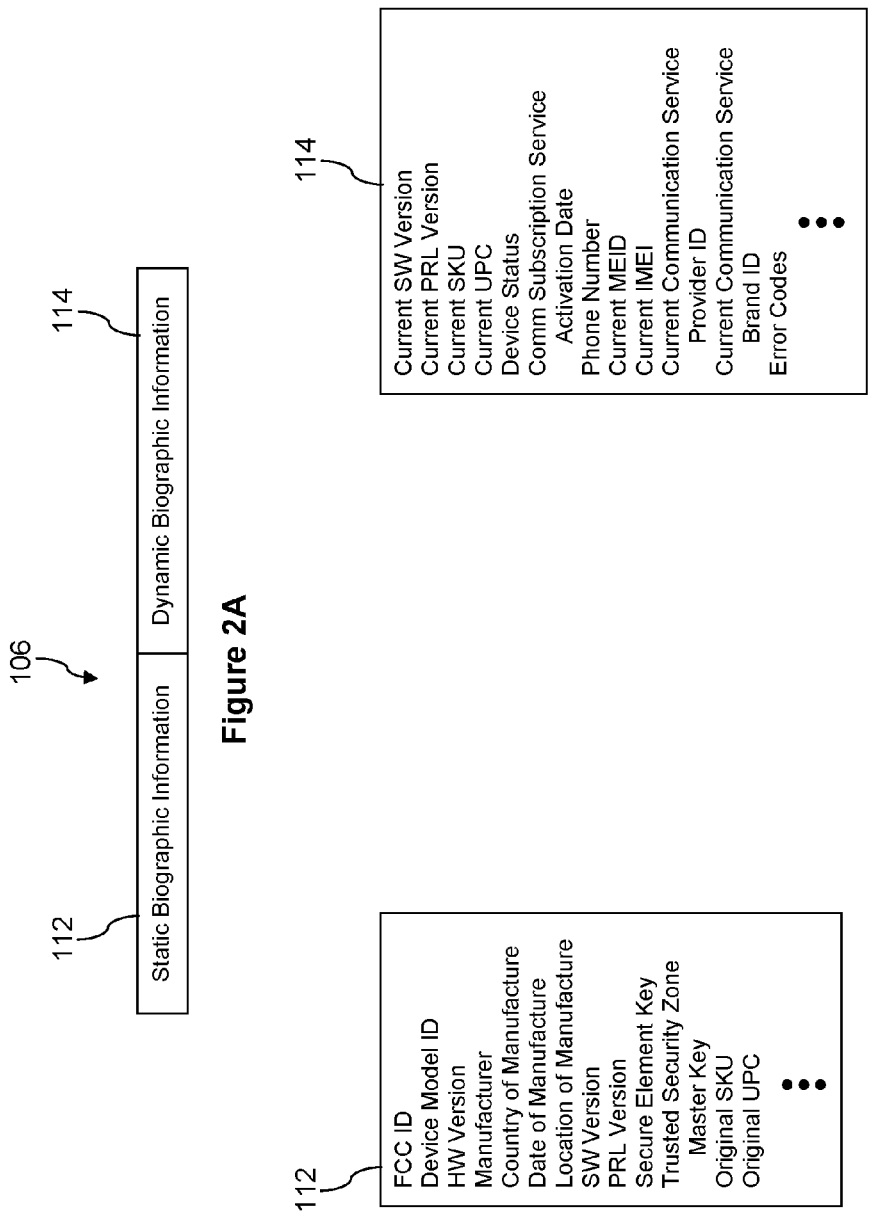
FIG. 2A is a diagram of a biographical digest according to an embodiment of the disclosure.
FIG. 2B is a diagram of a static portion of a biographical digest according to an embodiment of the disclosure.
FIG. 2C is a diagram of a dynamic portion of a biographical digest according to an embodiment of the disclosure.

In an embodiment, information that is contained in the static portion 112 remains constant and unchanged over the life of the mobile device 102 while the information that is contained in the dynamic portion 114 of the biographical digest 106 may change, for example as revised software, firmware, provisioning information, and configuration information is installed on the mobile device 102. The contents of the biographical digest 106, the static portion 112, and the dynamic portion 114 are discussed in more detail below with reference to FIG. 2.

An application 126 may be stored in the memory 118 and executed by the central processing unit 120 to write to the dynamic portion 114 of the biographical digest 106 via one or more buses of the mobile device 102. The application 126 may implement and/or enforce rules for accessing and interacting with the biographical digest 106. The application 126 may implement control rules and/or a software layer for managing the biographical digest 106 over the lifecycle of the device 102. The software layer may be implemented as an application, as illustrated, and/or as functionality encapsulated in an operating system of the mobile communication device 102. For further details of a software layer for managing the biographical digest 106, see U.S. patent application Ser. No. 13/857,138, filed Apr. 4, 2013, entitled "System for Managing a Digest of Biographical Information Stored in a Radio Frequency Identity Chip Coupled to a Mobile Communication Device," by Kevin R. Cordes, et al., which is hereby incorporated by reference herein in its entirety. When the RFID chip 104 that is communicatively coupled to the motherboard of the device is not used, the dynamic portion of the biographical digest of the isolated RFID chip 128 may be written to via near field communication by the NFC scanner 130 or by another near field communication transceiver. In an embodiment, the RFID chip 104, the isolated RFID chip 128, and/or the application 126 may expect an authorization key or token as a precondition for writing to the dynamic portion of the biographical digest.

In an embodiment, the processor 120 may transmit data to the RFID chip 104 to be written to the biographical digest 106, for example to the dynamic portion 114, over a data bus of the device 102. The processor 120 may transmit data to the RFID chip 104 by invoking and executing the application 126. The logic processor 116 may receive the data from the data bus of the device 102 and write it to the dynamic portion 114. In an embodiment, the processor 120 and/or the application 126 may parse the data to extract an authorization key and/or authorization token, validate the authorization key or token, and, provided the authorization key or token successfully validates, write the data to the dynamic portion 114. Alternatively, the logic processor 116 may validate an authorization key or token before writing data to the dynamic portion 114.

Data that is written by the processor 120 to the dynamic portion 114 may be transmitted to the mobile device 102 from a device coupled to the network 134 via the base transceiver station 132. For example, the service station 136 may transmit data to the processor 120 to write to the dynamic portion 114. The service station 136 may transmit, for example, data that resets error codes encoded in the dynamic portion 114 of the biographical digest 106. As another example, a software update may be performed over the air, and a remote management server (not show) of a wireless communication service provider that is coupled to the network 134 may transmit data that revises a current software version of the dynamic portion 114 of the biographical digest 106. Data may alternatively be written to the isolated RFID chip 128 using an NFC transceiver coupled to the service station 136 or coupled to the remote management server. Data may be written to the isolated RFID chip 128 by the general purpose NFC transceiver 124.

Data may be read from the RFID chip 104 and/or the isolated RFID chip 128 by the NFC scanner 130. The NFC scanner 130 may parse the biographical digest 106 into the static portion 112 and/or the dynamic portion 114 and extract the information encoded and/or encapsulated in the biographical digest 106. Alternatively, the NFC scanner 130 may provide the biographical digest 106 intact to a computer (not shown) that is communicatively coupled to the NFC scanner 130, and that computer may parse, extract, and analyze the biographical digest. The information obtained from the biographical digest 106 may be used in a variety of ways as further illustrated with reference to use cases described below.

The mobile communication device 102 may be any of a mobile phone, a personal digital assistant (PDA), a media player, a laptop computer, a notebook computer, a tablet computer, a removable wireless interface component, a head unit or telematics unit configured for installation into a vehicle, or other mobile communication device. The service station 136 and/or the NFC scanner 130 may be implemented as computers. Computer systems are described in detail hereinafter.

Turning now to FIG. 2A, FIG. 2B, and FIG. 2C, further details of the biographical digest 106 are described. The term 'biographical' is employed to suggest that the information contained is biographical and tells a story about the device 102. This story comprises information about the current state of the device 102 as well as about the birth or origins of the device 102. The information about the birth or origins of the device 102 are stored in the static portion 112 and is intended to remain constant, fixed, and unchanged over the life of the device 102. The information about the current state of the device 102 are store in the dynamic portion 114 and is intended to be updated and modified as the state of the device 102 changes, for example as the software of the device 102 is changed, as the device 102 is rebranded, as the communication service associated with the device 102 changes, and as other like changes occur. The term 'digest' is used to imply that the information may be combined or digested into a compact and/or encoded form suitable for storing, writing, and reading efficiently.

In an embodiment, the biographical digest 106 may comprise from about 200 characters of information to about 500 characters of information. It will be appreciated, however, that the teachings of the present disclosure are applicable to a biographical digest 106 of any size. As semiconductor manufacturing technology and radio frequency identity chip manufacturing technology evolve and improve, it would be expected that the size of the biographical digest 106 may increase with increased processing power and/or increased memory storage capacity of the radio frequency identity chip state-of-the-art.

In an embodiment, the static portion 112 may comprise information indicating one or more of a federal communications commission (FCC) identity, a device model identity, an initial hardware version identity, a manufacturer identity, a country of manufacturing identity (e.g., the identity of the country in which the device was manufactured), a date of manufacture, an identity of a location of manufacture, an initial software version identity, an initial preferred roaming list (PRL) identity, an original stock keeping unit (SKU) number or identity, and/or an original universal product code (UPC). It is understood that other information associated with the initial state of condition of the device 102 may also be stored in the static portion 112, for example test results, inspector identity, assembly line identity, and the like.

In an embodiment, the static portion 112 may comprise one or more initial security keys and/or authorization keys, for example a trusted security zone master key, a secure element (SE) key, or other security and/or authorization keys. Such keys or tokens may be stored in an encrypted form. A trusted security zone may be installed on the mobile communication device 102 to provide a hardware assisted security, for example based on either separate processors or separate virtual processors.

The static portion 112 may be writeable only during a manufacturing stage of the device 102. Upon completion of the manufacturing, the write access to the static portion 112 may desirably be blocked, for example fuses in the data write lines coupled to the static portion 112 may be blown, thereby isolating the write inputs of the static portion 112. Alternatively, the static portion 112 may be disabled for writing in another way. In an embodiment, the application 126 may enforce the block on writing to the static portion 112. The manufacturing process may comprise writing to the static portion 112, verifying the accuracy of the information written to the static portion 112, and only then disabling writing to the static portion 112.

In an embodiment, the dynamic portion 114 may comprise information indicating one or more of a current software version identity, a current preferred roaming list identity, a current stock keeping unit identity or number, a current universal product code, a current device status, a communication subscription service activation date, a phone number, a current mobile equipment identity (MEID), a current international mobile station equipment identity, a current communication service provider identity, a current communication service brand identity, and other information about the current state and/or configuration of the device 102 and/or its communication service plan.

The device status may assume a number of values such as new, refurbished, activated, dead or terminated, and/or other values. The device status may be employed by the device 102 to control operation modes of the device 102. For example, if the device status has been set to dead or terminated, the device 102 may not allow itself to attempt to connect to the base transceiver station 132 or to perform any other kind of radio communication. The device 102 in the dead or terminated status may further prevent presentation on a display of the device 102 or responding to inputs of any control input of the device 102. The device status may be associated with a lifecycle of the device 102 described below with reference to FIG. 3.

In an embodiment, the dynamic portion 114 may further comprise error codes. For example, as different processing errors or communications failures are experienced by the device 102, the application 126 may determine an error code associated with the condition and write this into an error codes portion of the dynamic portion 114. The error codes may comprise a concatenation of one or more error codes. For example, an error code may comprise an error identity and optionally further information about the error. The error codes may be indefinitely extendable by adding more error codes, as errors occur, at the tail end of the error codes. In an embodiment, a specific error code may be repeated in the error codes as often as the error has occurred. Alternatively, a specific error code may only be allowed to appear once in the error codes.

Alternatively, the error codes may comprise a vector where each element of the vector corresponds to a given error condition, and if the element is set, one or more instances of the corresponding specific error has been experienced by the device 102 and if the element is not set, no instance of the corresponding specific error has been experienced by the device 102. The error codes may be reset to an initial state indicating no errors have occurred, for example by a customer service representative after reading the error codes. The error codes may be used by a customer service representative to promote troubleshooting and correcting any problems that the device 102 may have.

In an embodiment, the dynamic portion 114 may comprise a counter that indicates how many times the dynamic portion 114 and/or the biographical digest 106 has been written to. Some RFID chips 104 may be specified as able to sustain a limited number of read cycles, and the counter may be used to identify when the RFID chip 104 may be reaching the end of its reliable life. When the counter indicates that the RFID chip 104 has exceeded a threshold of reliable write cycles, the application 126 may present a notification to a user of the mobile communication device 102 of the condition.

In an embodiment, the biographical digest 106 desirably may not contain any private information related to a user of the mobile communication device 102, for example no personal address, no name, no identification number such as a social security number or employee number. The biographical digest 106 may desirably be standardized for use across a plurality of different models of mobile communication devices 102 to promote using common NFC scanning equipment and/or common parsing software.

One of skill in the art will appreciate that the system 100 described above may be applied in a variety of different and useful ways. Several particular use cases are now described to provide further insight into how the system 100 may be applied, but it is understood that the disclosure contemplates other applications that are not described here to avoid prolixity and to promote conciseness.

In an embodiment, the system 100 may be usefully applied in a distribution center and/or an order fulfillment center. An order fulfillment center may receive mobile communication devices 102 from several different original equipment manufacturers (OEMs). The order fulfillment center may ship these same mobile communication devices 102 to retail stores for selling to walk-in customers, to enterprises for distribution to their employees for use in their day-to-day work, and to individuals who order a single mobile communication device 102 for their personal use. The numbers and the mix of different models of mobile communication devices 102 that may be shipped to these different categories of end users (or in the case of the retail store, an intermediate user) may be different. In an embodiment, a large order fulfillment center may handle between about 1 million to about 2 million mobile communication devices 102 per month. Alternatively, a smaller order fulfillment center may handle between about 100,000 to about 200,000 mobile communication devices 102 per month. The processes for handling these large volumes of device may benefit from the use of aspects of the system 100.

For example, when such large volumes of mobile communication devices 102 are flowing through an order fulfillment center there may be problems with pilferage. The order fulfillment center may place NFC scanners 130 proximate to exits to scan the biographical digests 106 of mobile communication devices 102 that are leaving the building. A computer coupled to the NFC scanners 130 may analyze the identity of the mobile communication devices 102 thus scanned and determine if any of the mobile communication devices 102 are being stolen. It is noted that the NFC scanners 130 may be able to interrogate the RFID chips 104, 128 associated with the devices 102 even when the battery is not installed in the devices 102, because the RFID chips 104, 128 can be energized by an energizing field radiated by the NFC scanner 130 as described above.

It may happen that a manufacturing problem occurred and resulted in some mobile communication devices 102 being flawed. The problem may affect only a selected number of mobile communication devices 102, for example devices 102 of a specific model, manufactured on a specific assembly line at a specific manufacturing location, on a specific date. By using a portable NFC scanner 130 coupled to a portable computing device that can implement a filter to identify devices 102 that have a biographical digest 106 that is consistent with the criteria described above, an order fulfillment center worker may more rapidly and conveniently identify the subject flawed devices 102. In the absence of the system 100 described herein, the order fulfillment center might otherwise be obligated to remove many devices 102 from their shipping boxes, scan the bar codes in their battery compartments to identify which devices 102 match the described criteria. Alternatively, perhaps the task to be performed is to identify one or more specific devices 102 from among a number of other devices 102 for fulfilling an order. Again, the system 100 can be applied to ease the order fulfillment process using the NFC scanner 130 coupled to a portable computer implementing a filter to identify devices 102 that have a biographical digest 106 that matches the criteria. It is noted that the NFC scanners 130 may be able to interrogate the RFID chips 104, 128 associated with the devices 102 even when the battery is not installed in the devices 102, because the RFID chips 104, 128 can be energized by an energizing field radiated by the NFC scanner 130 as described above.

A customer retail store may offer mobile communication devices 102 for sale as well as providing a first level of customer care. Customers may bring a mobile communication device 102 that has one or more perceived problems to the retail store for diagnosis and/or repair. The customer care representative may scan the customer's mobile communication device 102 to read the biographical digest 106. This information may be transported to the service station 136 or workstation that the customer care representative uses. Alternatively, the customer may use the NFC scanner 130 upon entering the store, for example by tapping the device 102 in at a customer care kiosk, before being called by the customer care representative. The customer care representative, based on the customer's description of his or her perceived trouble using the device 102 and based on the information contained in the biographical digest 106, may be able to quickly diagnose the cause of the perceived trouble and recommend a remedy or indeed fix the problem directly. It is noted that the NFC scanners 130 may be able to interrogate the RFID chips 104, 128 associated with the devices 102 even when the battery installed in the devices 102 is depleted and/or when the devices 102 are turned off, because the RFID chips 104, 128 can be energized by an energizing field radiated by the NFC scanner 130 as described above.

As an additional use case, the customer may complete a transaction for an accessory or other merchandise by tapping their mobile communication device 102 on the NFC scanner 130, for example at a transaction kiosk, and transfer the cost of the purchase to his or her post-paid communication service account or to deduct the cost of the purchase from his or her pre-paid communication service account balance. The retail store may link the customer payment transaction at the payment kiosk with a NFC scanner 130 at the exit to prevent customers leaving with unpaid for merchandise. It is noted that the NFC scanners 130 may be able to interrogate the RFID chips 104, 128 associated with the devices 102 even when the battery installed in the devices 102 is depleted and/or when the devices 102 are turned off, because the RFID chips 104, 128 can be energized by an energizing field radiated by the NFC scanner 130 as described above.

The system 100 may likewise be advantageously applied in returns and/or repair centers. The NFC scanner 130 can determine the status of the mobile communication device 102 by scanning the biographical digest 106. It is noted that the NFC scanner 130 may be able to interrogate the RFID chip 104, 128 associated with the device 102 even when the battery installed in the devices 102 is depleted and/or the device 102 is turned off because the RFID chips 104, 128 can be energized by an energizing field radiated by the NFC scanner 130 as described above. The refurbishment and/or repair of the device 102 may be completed more quickly and/or more efficiently than if a bar code in the battery compartment instead needed to be scanned.

Figure 3:
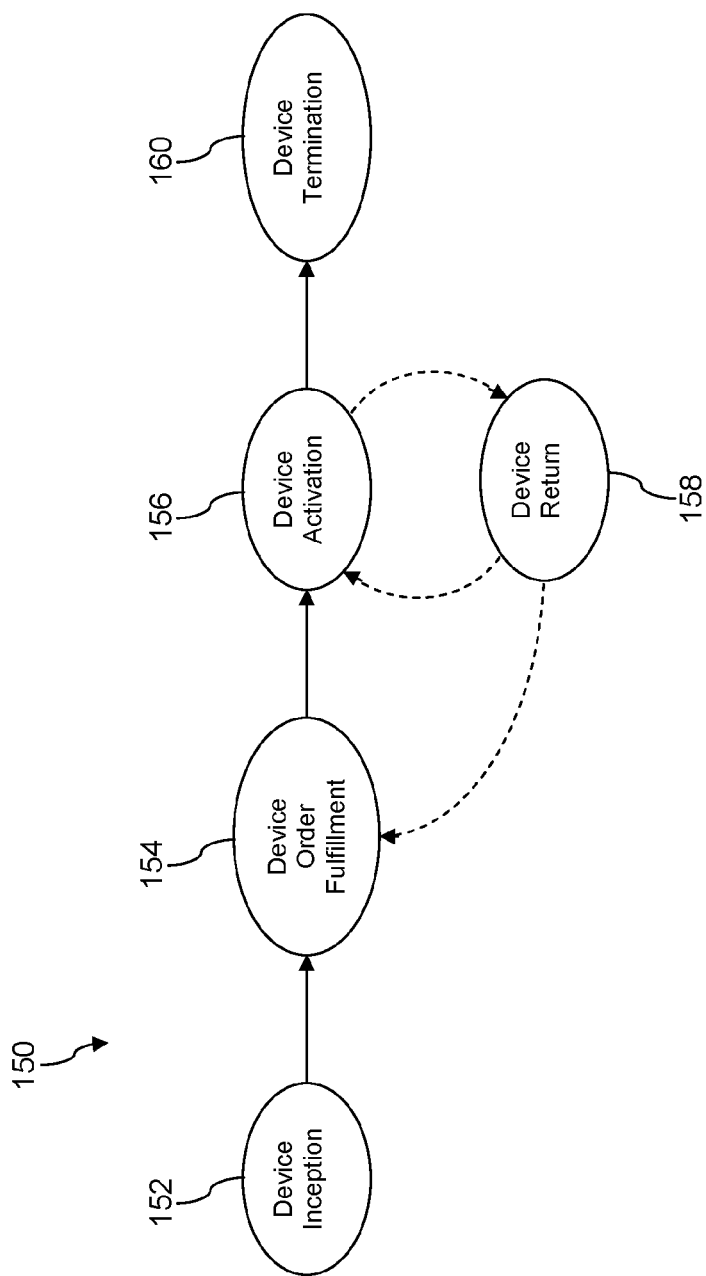
FIG. 3 is an illustration of a communication device lifecycle according to an embodiment of the disclosure.

Turning now to FIG. 3, a lifecycle 150 of the mobile communication device 102 is described. Upon completion of the manufacturing process the device 102 may be in the new status. This corresponds to device inception 152. The device 102 may ship to a distribution or order fulfillment center before being provided to end users at 154. When the device is activated at 156, the status of the device 102 may be changed to activated status. When the device is returned at 158, the device 102 may be reactivated at 156 under a different set of parameters, for example the device 102 may be rebranded from a first service brand to a second service brand pursuant to a change of wireless communication subscription service by a user. Alternatively, the device 102 may be set to the refurbish status and returned to a distribution or order fulfillment center. Ultimately, the device 102 may transition to the device termination 160 and receive the status dead or terminated.

Figure 4:
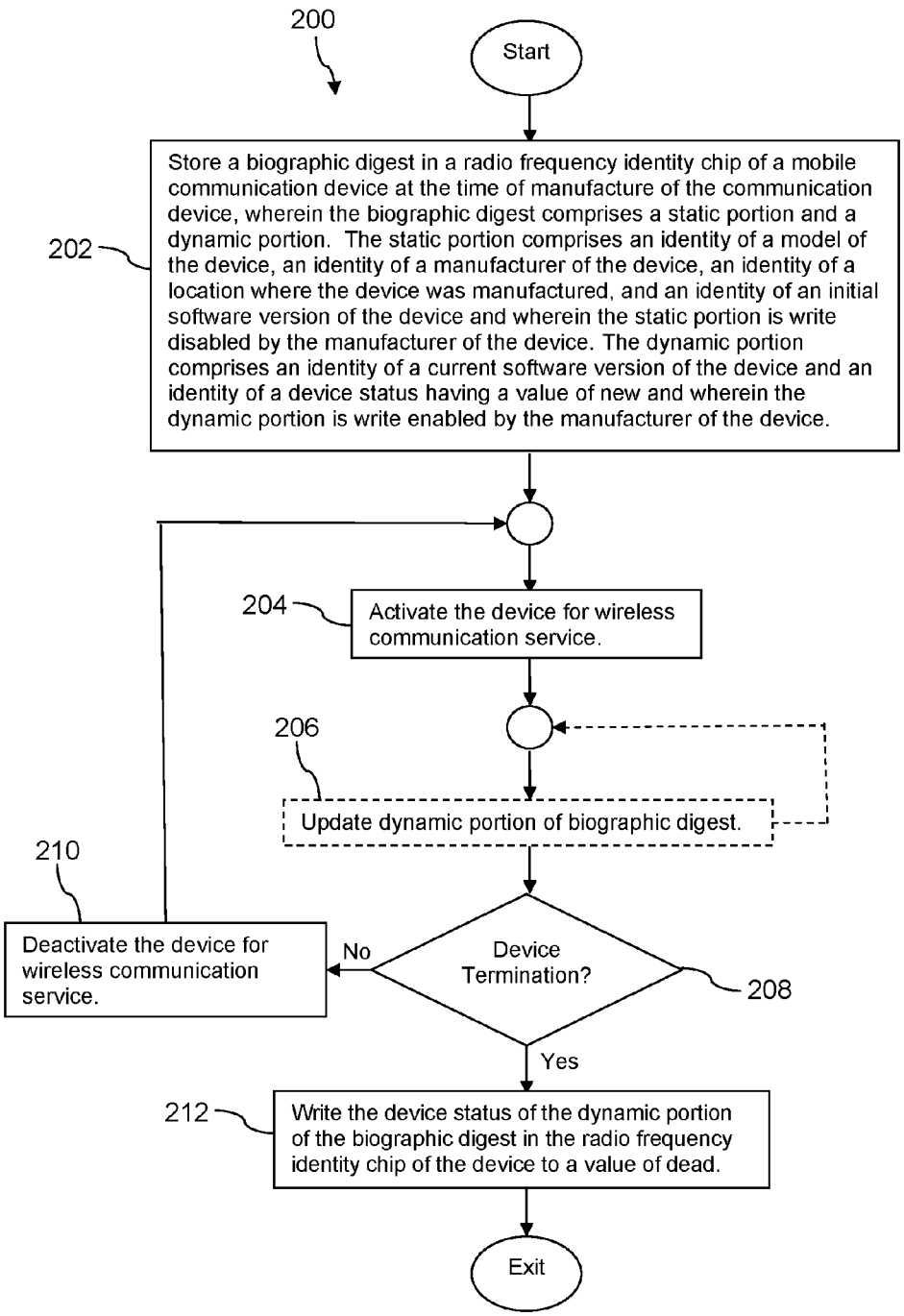
FIG. 4 is a flow chart of a method according to an embodiment of the disclosure.

Turning now to FIG. 4, a method 200 is described. At block 202, a biographical digest is stored in a radio frequency identity chip of a mobile communication device at the time of manufacture of the communication device, wherein the biographical digest comprises a static portion and a dynamic portion. In an embodiment, the static portion comprises an identity of a model of the device, an identity of a manufacturer of the device, an identity of a location where the device was manufactured, and an identity of an initial software version of the device. The static portion is write disabled by the manufacturer of the device, for example after writing the appropriate information to the static portion. In an embodiment, the dynamic portion comprises an identity of a current software version of the device and an identity of a device status having a value of new. The dynamic portion is left write enabled by the manufacturer of the device.

At block 204, the device is activated for wireless communication service. At block 206, the dynamic portion of the biographical digest is optionally updated. For example, a software version identity, a preferred roaming list identity, or other configuration information of the device is updated, and the dynamic portion of the biographical digest is changed, modified, written, and/or overwritten to correspond with the change. One of skill in the art will appreciate that the processing of block 206 may never occur, for example if the device is never updated with different configurations or software. Likewise, one of skill in the art will appreciate that the processing of block 206 may occur two or more times, for example when the device is repeatedly updated and/or reconfigured.

At block 208, the device may progress to block 210 where the device is deactivated for wireless communication service, for example when the device is returned by a user. From block 210, the processing may proceed to block 204. At block 208, if the device is transitioning to a terminated or dead status, the processing proceeds to block 212. At block 212, the device status of the dynamic portion of the biographical digest is written to a value of dead or terminated in the RFID chip of the device, for example the RFID chip 104 or the isolated RFID chip 128. After the device status of the dynamic portion is written to a terminated or dead status, the dynamic portion of the biographical digest may be disabled for writing. One of skill in the art will appreciate that different mobile communication devices 102 may take different paths through the flow chart illustrated in FIG. 4.

Figure 5:
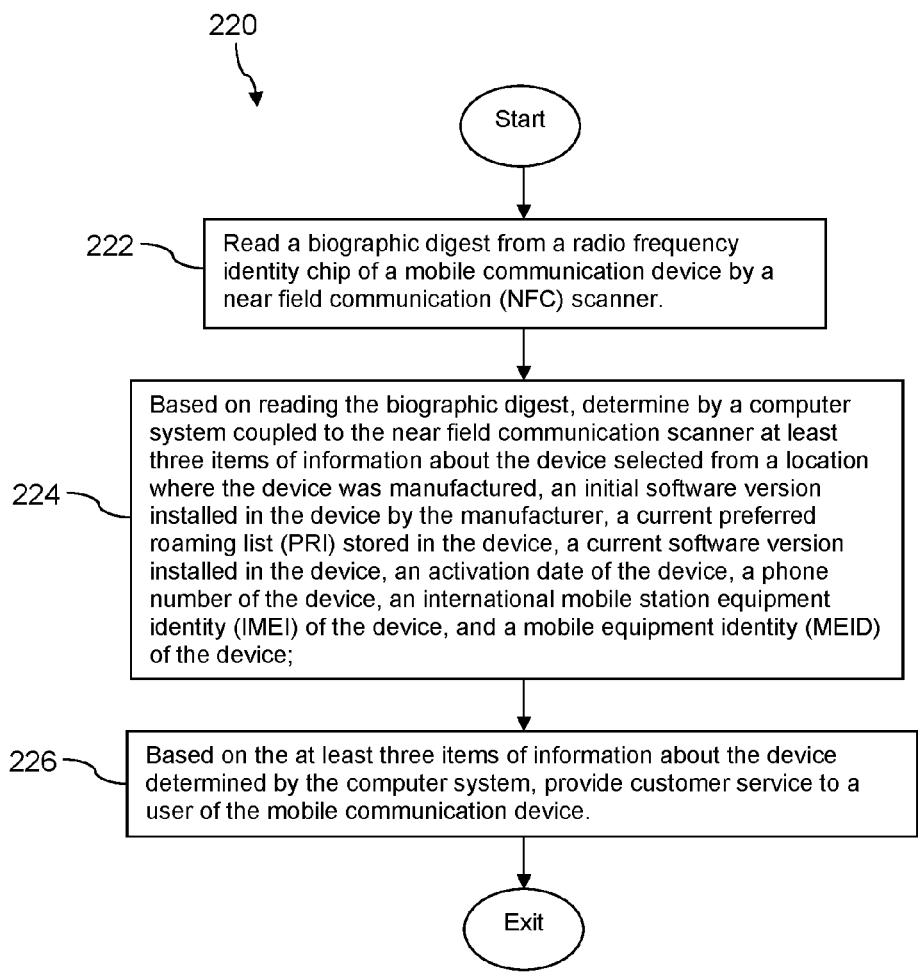
FIG. 5 is a flow chart of another method according to an embodiment of the disclosure.

Turning now to FIG. 5, a method 220 is described. At block 222, a biographical digest is read from a radio frequency identity chip of a mobile communication device by a near field communication (NFC) scanner. At block 224, based on reading the biographical digest, a computer system coupled to the near field communication scanner determines at least three items of information about the device selected from a location where the device was manufactured, an initial software version installed in the device by the manufacturer, a current preferred roaming list (PRI) stored in the device, a current software version installed in the device, an activation date of the device, a phone number of the device, an international mobile station equipment identity (IMEI) of the device, and a mobile equipment identity (MEID) of the device. At block 226, based on the at least three items of information about the device determined by the computer system, customer service is provided to a user of the mobile communication device.

Figure 6:
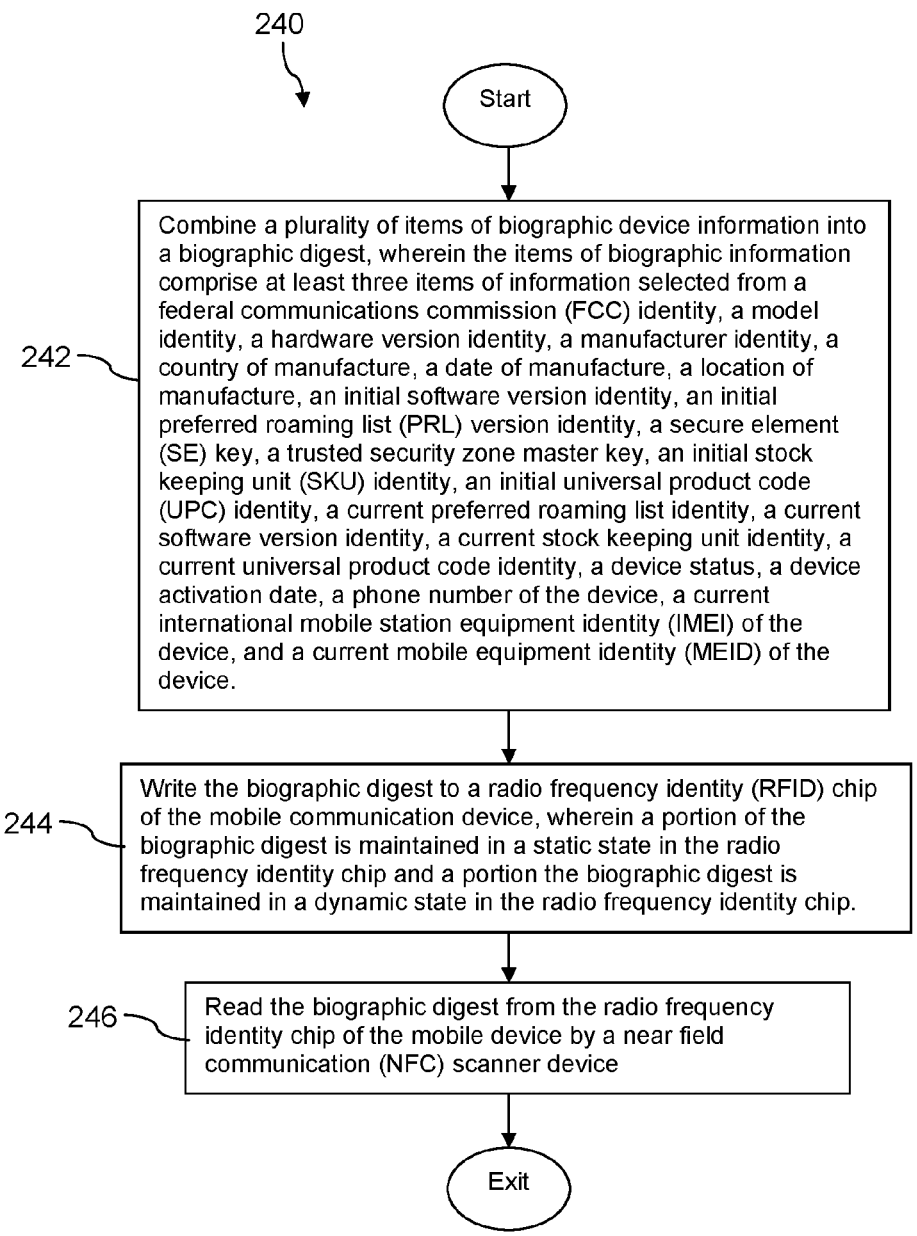
FIG. 6 is a flow chart of yet another method according to an embodiment of the disclosure.

Turning now to FIG. 6, a method 240 is described. At block 242, a plurality of items of biographical device information are combined into a biographical digest, wherein the items of biographical information comprise at least three items of information selected from a federal communications commission (FCC) identity, a model identity, a hardware version identity, a manufacturer identity, a country of manufacture, a date of manufacture, a location of manufacture, an initial software version identity, an initial preferred roaming list (PRL) version identity, a secure element (SE) key, a trusted security zone master key, an initial stock keeping unit (SKU) identity, an initial universal product code (UPC) identity, a current preferred roaming list identity, a current software version identity, a current stock keeping unit identity, a current universal product code identity, a device status, a device activation date, a phone number of the device, a current international mobile station equipment identity (IMEI) of the device, and a current mobile equipment identity (MEID) of the device.

At block 244, write the biographical digest to a radio frequency identity (RFID) chip of the mobile communication device, wherein a portion of the biographical digest is maintained in a static state in the radio frequency identity chip and a portion the biographical digest is maintained in a dynamic state in the radio frequency identity chip. At block 246, read the biographical digest from the radio frequency identity chip of the mobile device by a near field communication (NFC) scanner device.

Figure 7:
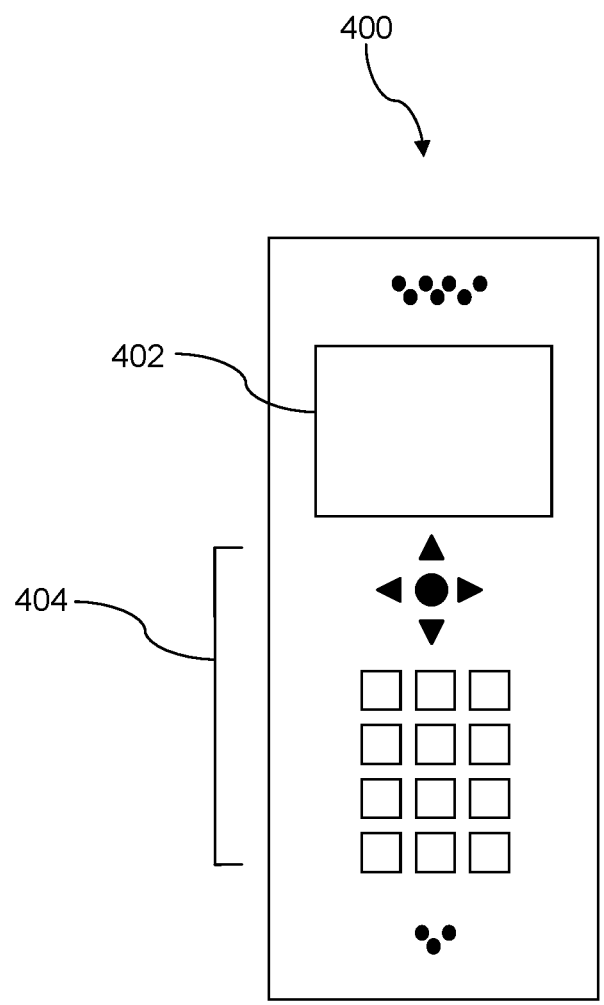
FIG. 7 is an illustration of a handset according to an embodiment of the disclosure.

FIG. 7 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 8:
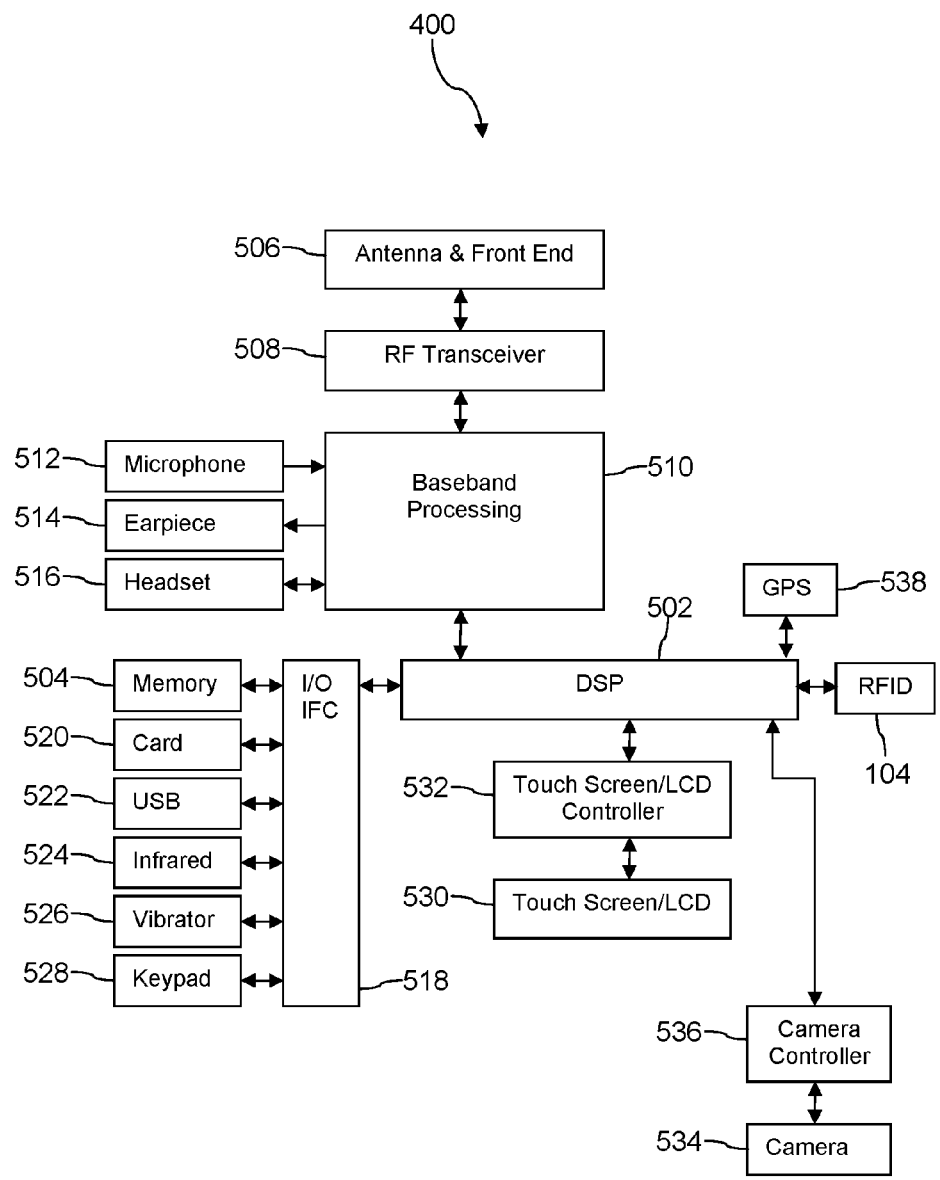
FIG. 8 is a block diagram of a handset according to an embodiment of the disclosure.

FIG. 8 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the DSP 502 or other processor may communicate with the RFID chip 104, for example via a memory bus and/or an address bus. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502. One skilled the art will appreciate that the DSP 502 or other processors may interact with and communicate with the various components via one or more address bus (not shown) and/or one or more data bus (not shown).

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 9A:
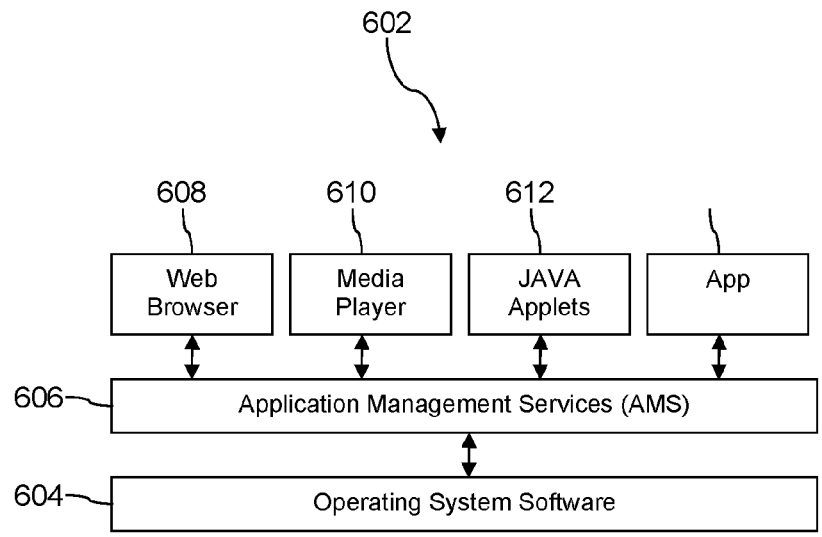
FIG. 9A is a block diagram of a software architecture of a handset according to an embodiment of the disclosure.

FIG. 9A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 9B:
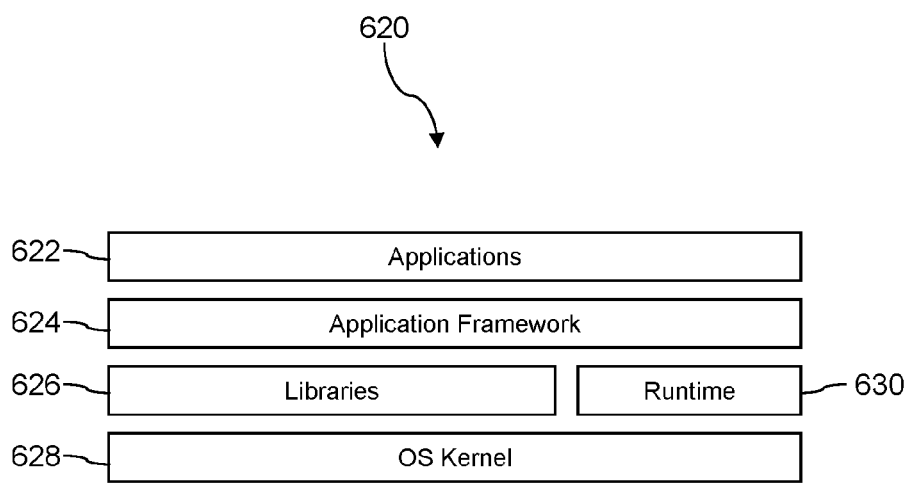
FIG. 9B is a block diagram of another software architecture of a handset according to an embodiment of the disclosure.

FIG. 9B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 10:
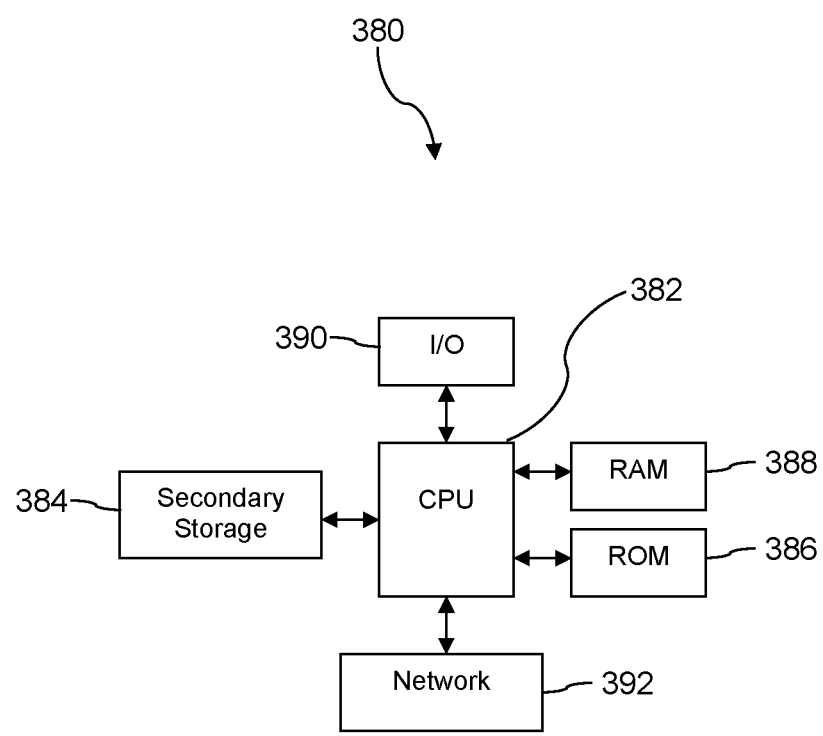
FIG. 10 is a block diagram of a computer system according to an embodiment of the disclosure.

FIG. 10 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of obtaining information about a mobile communication device from a radio frequency identity (RFID) chip in the mobile communication device, the method comprising:

reading, by a near field communication (NFC) scanner, a biographical digest from the RFID chip in the mobile communication device, wherein the RFID chip comprises non-transitory memory areas corresponding to a static portion and a dynamic portion of the biographical digest, and wherein information in the static portion cannot be altered but information in the dynamic portion is alterable prior to a device status of the dynamic portion indicating a value of dead or terminated;

based on reading the biographical digest from both the static portion and dynamic portion, determining, by a computer system that is communicatively coupled to the NFC scanner, at least three items of information about the mobile communication device selected from: a location where the mobile communication device was manufactured, an initial software version installed in the mobile communication device by a manufacturer, a current preferred roaming list (PRI) stored in the mobile communication device, a current software version installed in the mobile communication device, an activation date of the mobile communication device, a phone number of the mobile communication device, an international mobile station equipment identity (IMEI) of the mobile communication device, and a mobile equipment identity (MEID) of the mobile communication device; and providing, by the computer system to a display, the at least three items of information about the mobile communication device determined by the computer system.

2. The method of claim 1, further comprising energizing, by providing an energizing radio field radiated by the NFC scanner, the RFID chip such that the biographical digest is readable irrespective of the mobile communication device having a dead battery, having no battery installed, or being turned off.

3. The method of claim 1, wherein the dynamic portion of the biographical digest comprises error codes indicating functional deficiencies experienced by the mobile communication device, and wherein customer service to a user of the mobile communication device is based at least in part on the error codes.

4. The method of claim 3, further comprising: writing, by the computer system to the dynamic portion on the RFID chip of the mobile communication device, to instruct one of deleting the error codes or resetting the error codes.

5. The method of claim 4, wherein the computer system writes to the RFID chip of the mobile communication device via a communication link that does not include a NFC antenna of the RFID chip.

6. The method of claim 1, wherein reading the biographical digest by the NFC scanner comprises the NFC scanner providing an authorization code is associated with a wireless communication service provider, and wherein the RFID chip of the mobile communication device does not expose the biographical digest to the NFC scanner responsive to the authorization code not passing an authorization validation conducted by the RFID chip of the mobile communication device.

7. The method of claim 1, wherein the phone number of the mobile communication device is one of the items of information determined by the computer system and a name identifying a user is determined based on an association with the phone number.

8. The method of claim 1, wherein write access to the non-transitory memory areas corresponding to the static portion of the biographical digest is blocked by the RFID chip after being written to by the manufacturer of the mobile communication device.

9. The method of claim 8, wherein write access to the static portion is disabled due to a write line on the RFID chip being disabled independently from a write line for the dynamic portion.

10. The method of claim 1, wherein information in the non-transitory memory areas corresponding to the static portion of the biographical digest cannot be altered due to a write line on the RFID chip being disabled, and wherein information in the non-transitory memory areas corresponding to the dynamic portion is unalterable in response to a device status indicating a value of dead or terminated.

11. The method of claim 1, further comprising: in response to providing the at least three items of information, transmitting a software update to the mobile communication device.

12. The method of claim 11, further comprising: based on the software update, writing data about the software update only to the dynamic portion of biographical digest while the static portion remains unaltered.

13. The method of claim 1, further comprising: in response to providing the at least three items of information, altering, by transmitting a write input along an execution path corresponding to the dynamic portion, only the dynamic portion of biographical digest while the static portion remains unaltered.

14. The method of claim 13, further comprising: in response to providing the at least three items of information, determining, by the computer system, an authorization key associated with the non-transitory memory areas corresponding to the dynamic portion in the RFID chip.

15. The method of claim 14, wherein altering only the dynamic portion is based on the authorization key being validated by the RFID chip.

16. The method of claim 1, further comprising: providing an authentication key to a logic processor of the RFID chip, wherein write access to only the dynamic portion is based on the authentication key.

17. The method of claim 1, further comprising: changing, by transmitting write input to the dynamic portion, a device status value associated with a lifecycle of the mobile communication device.

18. The method of claim 1, wherein the RFID chip at least actively or passively blocks write access and alteration to the static portion while permitting read access from the static portion.

19. The method of claim 1, further comprising altering the non-transitory memory areas corresponding to the dynamic portion to become unwriteable based on a device status being written to a value of dead.

20. The method of claim 19, wherein the dynamic portion becomes unwritable based on a fuse in a write line associated with the dynamic portion being blown.

* * * * *